United States Patent
Kubo et al.

(10) Patent No.: US 9,766,527 B2
(45) Date of Patent: Sep. 19, 2017

(54) ELECTROCHROMIC ELEMENT, OPTICAL FILTER, LENS UNIT, IMAGE PICKUP APPARATUS, AND WINDOW MEMBER

(71) Applicant: CANON KABUSHIKI KAISHA, Tokyo (JP)

(72) Inventors: Wataru Kubo, Inagi (JP); Satoshi Igawa, Fujisawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/191,827

(22) Filed: Jun. 24, 2016

(65) Prior Publication Data

US 2017/0003562 A1 Jan. 5, 2017

(30) Foreign Application Priority Data

Jul. 2, 2015 (JP) .................................. 2015-133575
Jun. 14, 2016 (JP) .................................. 2016-117590

(51) Int. Cl.
*G02F 1/153* (2006.01)
*G02F 1/15* (2006.01)
*G09G 3/38* (2006.01)
*G02F 1/155* (2006.01)
*G02F 1/163* (2006.01)

(52) U.S. Cl.
CPC .............. *G02F 1/153* (2013.01); *G09G 3/38* (2013.01); *G02F 1/155* (2013.01); *G02F 1/163* (2013.01); *G02F 2001/1502* (2013.01); *G02F 2001/1512* (2013.01); *G02F 2001/1515* (2013.01)

(58) Field of Classification Search
CPC ........ G02F 1/15; G02F 1/1506; G02F 1/1508; G02F 1/153; G02F 1/1533; G02F 1/155; G02F 1/161; G02F 1/163; G02F 2001/1502; G02F 2001/1512; G02F 2001/1515; G09G 3/38; C09K 9/00
USPC .............. 359/245, 265, 270, 272, 273, 275; 345/105
See application file for complete search history.

(56) References Cited

U.S. PATENT DOCUMENTS 4,550,982 A * 11/1985 Hirai .......................... G02F 1/15
                                                                359/267
6,188,505 B1 2/2001 Lomprey et al.
(Continued)

OTHER PUBLICATIONS

Kubo et al., U.S. Appl. No. 15/170,091, filed Jun. 1, 2016.
(Continued)

*Primary Examiner* — Loha Ben
(74) *Attorney, Agent, or Firm* — Fitzpatrick, Cella, Harper & Scinto

(57) ABSTRACT

Provided is an electrochromic element, including a first electrode, a second electrode, a carrier, and an electrolyte, and an anodic organic electrochromic compound and a cathodic redox substance that are arranged between the first electrode and the second electrode, at least one of the first electrode and the second electrode being transparent, in which: the electrolyte, and the anodic organic electrochromic compound and the cathodic redox substance are mixed; the electrolyte is in contact with the first electrode, the second electrode, and the carrier; the carrier has a redox substance; the reduced form of the redox substance of the carrier is more easily oxidized than the reduced form of the anodic organic electrochromic compound.

19 Claims, 9 Drawing Sheets

(56) References Cited

U.S. PATENT DOCUMENTS

| | | | |
|---|---|---|---|
| 7,450,292 B1* | 11/2008 | Burrell | B60R 1/088 |
| | | | 252/583 |
| 2015/0212382 A1 | 7/2015 | Miyazaki | |
| 2017/0003563 A1* | 1/2017 | Kubo | G02F 1/155 |

OTHER PUBLICATIONS

Kubo et al., U.S. Appl. No. 15/191,843, filed Jun. 24, 2016.
Rachel Cinnsealach et al., "Coloured Electrochromic Windows Based on Nanostructured TiO2 Films Modified by Adsorbed Redox Chromophores," 57(2) Solar Energy Materials and Solar Cells 107-125 (Feb. 1999).

* cited by examiner

ELECTROCHROMIC ELEMENT, OPTICAL FILTER, LENS UNIT, IMAGE PICKUP APPARATUS, AND WINDOW MEMBER

BACKGROUND OF THE INVENTION

Field of the Invention

The present invention relates to an electrochromic element, and an optical filter, a lens unit, an image pickup apparatus, and a window member each using the element.

Description of the Related Art

An electrochromic (hereinafter sometimes abbreviated as "EC") element that uses an EC material as a substance that undergoes changes in optical absorption properties (absorption wavelength and absorbance) through an electrochemical redox reaction is applied to a display apparatus, a variable reflectance mirror, a variable transmission window, and the like. The absorption wavelength of an organic electrochromic compound out of the EC materials can be designed and changed, and hence the compound can achieve high coloring/decoloring contrast. Accordingly, active development of the compound has been performed.

One of the greatest challenges posed by such EC element is the suppression of changes in optical characteristics with a lapse of time. In U.S. Pat. No. 6,188,505, there is a disclosure that a material that is more easily oxidized than a non-EC anodic EC material and a material that is more easily reduced than a cathodic EC material are used in a complementary EC element obtained by dissolving an EC material in an electrolyte. Those materials are hereinafter referred to as "redox buffers."

In the EC element disclosed in U.S. Pat. No. 6,188,505, an oxidized form and a reduced form of the redox buffers are more stable than an oxidized form as a colored form of the anodic EC material and a reduced form as a colored form of the cathodic EC material, respectively. Therefore, even when charge imbalance occurs in a decoloring operation, insofar as the amounts of charge of the redox buffers can cover, generation of the oxidized form and the reduced form of the corresponding redox buffers are dominant over remaining of the colored forms of the EC materials. The redox buffers are non-EC materials, and thus, even when the oxidized form and the reduced form of the redox buffers are generated, the redox reactions thereof do not affect the transmittance of light. In other words, the redox buffers add a charge balance region in which the color does not fluctuate so that the charge imbalance of the EC element does not directly result in a decoloring failure.

However, in U.S. Pat. No. 6,188,505, the redox buffers are more easily oxidized than the anodic EC material or more easily reduced than the cathodic EC material, and thus, are more liable to react in terms of the potential than the EC materials. Therefore, in a normal coloring operation of the EC element, the redox buffers react ahead of (at least equivalent to) the EC materials. As a result, there are problems in that, as compared to a case where the redox buffers are not used, a current that does not contribute to the coloring unnecessarily flows to increase the power consumption and to reduce the response speed.

Further, even when the redox buffers are used as in U.S. Pat. No. 6,188,505, charge imbalance between display electrodes is not eliminated. Specifically, only the colored forms of the EC materials are reduced (instead, the oxidized/reduced forms of the redox buffers that are not colored or decolored are generated), and the charge balance between the display electrodes is not affected. When charge imbalance occurs in a complementary EC element, the ratio of the colored form of the anodic EC material to the colored form of the cathodic EC material changes.

Specifically, there occurs a situation in which the ratio of the colored form of a material opposite in polarity to a material remaining as a result of the charge imbalance becomes smaller than the ratio of the colored form of the material remaining as a result of the charge imbalance. For example, when the coloring of the EC element is started from the charge imbalance state in which the colored form of the cathodic EC material remains, the ratio of the colored form resulting from the anode material becomes smaller than the ratio of the colored form resulting from the cathode material as compared to a state in which the charge imbalance does not occur. As a result, the actual absorption spectrum of the EC element changes from an absorption spectrum assumed at the time of its design, and the change appears as a change in absorption color of the EC element. Accordingly, the foregoing situation is not preferred. In U.S. Pat. No. 6,188,505, at the time of a decoloring operation by the charge imbalance, each of the redox buffers accepts the charge of the remaining oxidized form of the anode material or the remaining reduced form of the cathode material, and hence suppresses the remaining of the colored form of one of the anode and cathode polarities. However, the charge imbalance itself between the display electrodes is not corrected, and hence the shift of the ratio of the colored form of the anodic EC material to the colored form of the cathodic EC material is not corrected. In other words, merely a situation in which a color is observed at the time of the decoloring operation when the charge imbalance between the display electrodes occurs is suppressed, and at the time of a coloring operation, a colored state in which the ratio between the anode material and the cathode material changes from the original one owing to the charge imbalance appears.

SUMMARY OF THE INVENTION

The present invention has been made to solve the problems, and an object of the present invention is to provide an electrochromic element that can correct charge imbalance that may occur, that is suppressed in decoloring failure (color remaining) at the time of decoloring, and that is excellent in reproducibility of a spectrum at the time of a coloring operation.

According to a first embodiment of the present invention, there is provided an electrochromic element, including: a first electrode; a second electrode; a carrier; and an electrolyte, an anodic organic electrochromic compound, and a cathodic redox substance that are arranged between the first electrode and the second electrode, at least one of the first electrode and the second electrode being transparent, in which: the electrolyte, the anodic organic electrochromic compound, and the cathodic redox substance are mixed; the electrolyte is in contact with the first electrode, the second electrode, and the carrier; the carrier further has a redox substance; and a reduced form of the redox substance of the carrier is more easily oxidized than a reduced form of the anodic organic electrochromic compound.

According to a second embodiment of the present invention, there is provided an electrochromic element, including: a first electrode; a second electrode; a carrier; and an electrolyte, a cathodic organic electrochromic compound, and an anodic redox substance that are arranged between the first electrode and the second electrode, at least one of the first electrode and the second electrode being transparent, in which: the electrolyte, the cathodic organic electrochromic compound, and the anodic redox substance are mixed; the electrolyte is in contact with the first electrode, the second electrode, and the carrier; the carrier further has a redox substance; and an oxidized form of the redox substance of the carrier is more easily reduced than an oxidized form of the cathodic organic electrochromic compound.

According to a third embodiment of the present invention, there is provided an electrochromic element, including: a first electrode; a second electrode; a carrier; and an electrolyte, an anodic organic electrochromic compound, and a cathodic organic electrochromic compound that are arranged between the first electrode and the second electrode, at least one of the first electrode and the second electrode being transparent, in which: the electrolyte, the anodic organic electrochromic compound, and the cathodic organic electrochromic compound are mixed; the electrolyte is in contact with the first electrode, the second electrode, and the carrier; the carrier has a redox substance; a reduced form of the redox substance of the carrier is more easily oxidized than a reduced form of the anodic organic electrochromic compound; and an oxidized form of the redox substance of the carrier is more easily reduced than an oxidized form of the cathodic organic electrochromic compound.

Further features of the present invention will become apparent from the following description of exemplary embodiments with reference to the attached drawings.

BRIEF DESCRIPTION OF THE DRAWINGS

FIG. 6A is a perspective view, and FIG. 6B is a sectional view taken along the line 6B-6B of FIG. 6A.

DESCRIPTION OF THE EMBODIMENTS

Figure 1A:
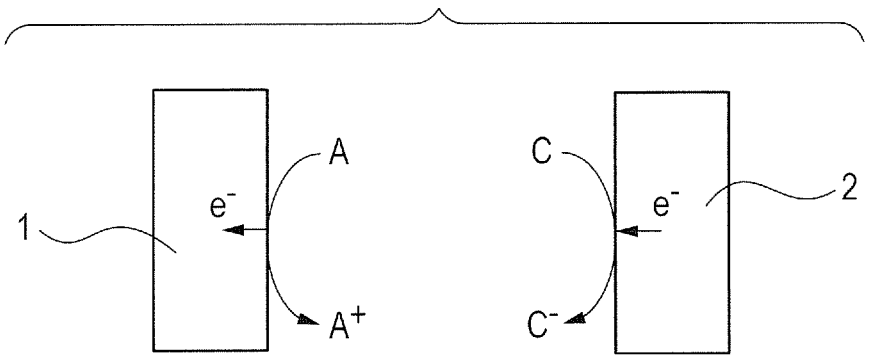
FIG. 1A, FIG. 1B, and FIG. 1C are each a view for illustrating the concept of charge balance/imbalance.

Preferred embodiments of the present invention will now be described in detail in accordance with the accompanying drawings.

An electrochromic element (EC element) of the present invention includes a first electrode, a second electrode, and a carrier. In the present invention, at least one of the first electrode and the second electrode is transparent. In the present invention, the EC element includes an electrolyte, and an anodic organic electrochromic compound and/or a cathodic organic electrochromic compound between the first electrode and the second electrode.

In the present invention, the EC element includes at least two kinds of redox substances (including the organic electrochromic compound) between the first electrode and the second electrode. The two kinds of redox substances to be incorporated between the first electrode and the second electrode are specifically one of the combinations described in the following (i) to (iii):

(i) the anodic organic electrochromic compound and a cathodic redox substance;

(ii) the cathodic organic electrochromic compound and an anodic redox substance; and (iii) the anodic organic electrochromic compound and the cathodic organic electrochromic compound.

In the present invention, the electrolyte and the two kinds of redox substances (including the organic electrochromic compound) corresponding to one of the (i) to (iii) are mixed. In the present invention, the electrolyte is in contact with the first electrode, the second electrode, and the carrier. In the present invention, the carrier has a redox substance. When the anodic organic electrochromic compound (EC material) is incorporated between the first electrode and the second electrode, the reduced form of the redox substance of the carrier is more easily oxidized than the reduced form of the anodic organic electrochromic compound. Meanwhile, when the cathodic organic electrochromic compound (EC material) is incorporated between the first electrode and the second electrode, the oxidized form of the redox substance of the carrier is more easily reduced than the oxidized form of the cathodic organic electrochromic compound.

In the present invention, the anodic redox substance and the cathodic redox substance are used to alleviate the coloring/decoloring failure of an EC element called a complementary element, in which at least one of these redox substances is an EC material, due to charge imbalance. The concept of charge balance/imbalance is described later.

1. Redox Substance

In the present invention, the redox substance is a compound that can repeatedly cause a redox reaction in a predetermined potential range. The redox substance includes an inorganic compound and an organic compound, and both the compounds can be used in the present invention without any particular limitation. Of those, a redox substance formed of an organic compound is preferably used in terms of adaptability to the use environment of the EC material to be used.

In the following description, the redox substance is described as, for example, "anodic redox substance" or "cathodic redox substance" in some cases. The anodic redox substance typically refers to a substance that is in a reduced state under a state in which the element is not driven, but is brought into an oxidized state under a state in which the element is driven (especially colored). In addition, the cathodic redox substance typically refers to a substance that is in an oxidized state under a state in which the element is not driven, but is brought into a reduced state under a state in which the element is driven (especially colored).

2. Organic Electrochromic (EC) Material

In the present invention, the organic electrochromic (EC) material is one kind of redox substance, and is a substance whose light absorption characteristics in a light wavelength region targeted by the element are changed by a redox reaction. The electrochromic material includes an organic compound and an inorganic compound, but in the following description, the organic electrochromic material is referred to as "EC material." In addition, the light absorption characteristics as used herein typically refer to a light absorption state and a light transmission state, and the EC material is a material whose light absorption state and light transmission state are switched to each other.

Incidentally, in the following description, the EC material is described as "anodic EC material" or "cathodic EC material" in some cases. The anodic EC material refers to a material having the following feature: in the light wavelength region targeted by the element, the state of the EC material is changed from a light transmission state to a light absorption state by an oxidation reaction by which an electron is removed from the EC material. In addition, the cathodic EC material refers to a material having the following feature: in the light wavelength region targeted by the element, the state of the EC material is changed from a light transmission state to a light absorption state by a reduction reaction by which an electron is donated to the EC material.

3. Oxidized Form and Reduced Form

The terms "oxidized form" and "reduced form" to be used for the redox substance and the EC material are described below. In the following description, the oxidized form of the redox substance or the EC material refers to a form that is reduced to a reduced form by a reduction reaction involving one or more electrons in an electrode when the corresponding reduction reaction reversibly progresses. Meanwhile, the reduced form of the redox substance or the EC material refers to a form that is oxidized to an oxidized form by an oxidation reaction involving one or more electrons in an electrode when the corresponding oxidation reaction reversibly progresses.

In some documents, the following expression is used as an expression describing the state of each of the redox substance and the EC material: the state is changed from an oxidized form to a reduced form via a neutral form (and vice versa). However, in the following description, basically, the terms "oxidized form" and "reduced form" are used under the recognition that what is produced at the time of the reduction of an oxidized form is a reduced form and what is produced at the time of the oxidation of a reduced form is an oxidized form. For example, ferrocene having divalent iron (neutral form as a whole molecule) is the reduced form of ferrocene (anodic redox substance) when ferrocene functions as an anodic redox substance. A form in which iron is brought into a trivalent state by the oxidation of the reduced form is the oxidized form of ferrocene (anodic redox substance). In addition, when a dication salt of a viologen functions as a cathodic EC material, the dication salt is the oxidized form of the cathodic EC material. In addition, a monocation salt obtained by subjecting the dication salt to one-electron reduction is the reduced form of the cathodic EC material.

4. Electrolyte

In the present invention, the electrolyte is not limited to the electrolyte itself, and includes the concept of an electrolytic solution prepared by dissolving the electrolyte in a solvent. In the present invention, the electrolyte includes, for example, a solution obtained by dissolving a salt compound in a solvent, an ionic liquid, a gel electrolyte, and a polymer electrolyte.

5. Redox Substance of Carrier

The carrier constituting the EC element of the present invention has the redox substance. The phrase "the carrier has the redox substance (the redox substance of the carrier)" as used herein means that the redox substance is directly or indirectly fixed to the carrier. When the redox substance is directly fixed to the carrier, the redox substance is in a state of being fixed to the carrier by a physical or chemical factor without the intermediation of any other substance. Meanwhile, when the redox substance is indirectly fixed to the carrier, the redox substance is in a state of being physically or chemically fixed to the carrier through the intermediation of, for example, a substance fixed to the carrier.

The carrier is a member that does not exchange charge with an external circuit, and is a member having the redox substance under such a state as to enable charge exchange between the substance and the EC material in the electrolyte. The carrier differs from an electrode that exchanges charge with the EC material in the electrolyte and exchanges charge with the external circuit in the foregoing point. Meanwhile, even in the case of a material to be generally used as an electrode material, when the material is not in a state in which the material has a redox substance and hence can exchange charge with the external circuit, the material can be treated as a carrier. The redox substance of the carrier does not actively contribute to a coloring/decoloring step at the time of the driving of the element, and serves to achieve charge balance to be described later.

6. Charge Balance/Imbalance

Figure 1B:
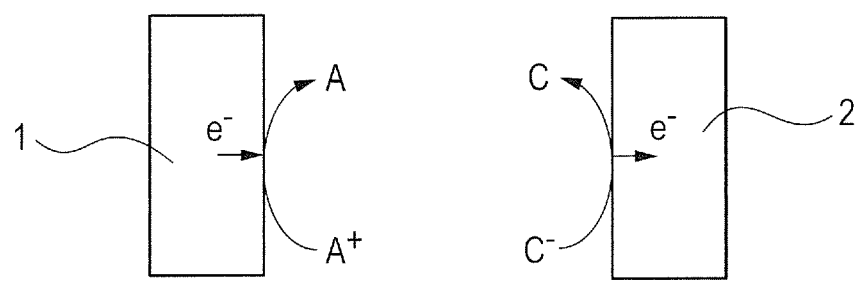
Figure 1C:
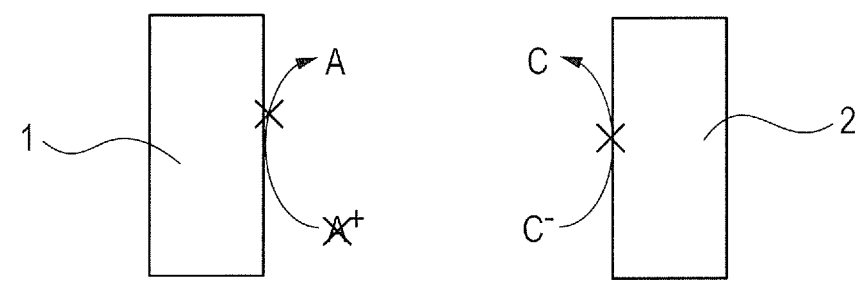

The concept of charge balance/imbalance is described below with reference to the drawings. FIG. 1A to FIG. 1C are each a view for illustrating the concept of the charge balance/imbalance. In each of FIG. 1A to FIG. 1C, a complementary EC element is of interest. In each of FIG. 1A to FIG. 1C, a first electrode 1 serving as an anode and a second electrode 2 serving as a cathode are illustrated. In addition, in each of FIG. 1A to FIG. 1C, the reduced form (decolored state) of an anodic EC material is represented by reference symbol A, and the oxidized form (colored state) of the anodic EC material is represented by reference symbol A. Further, in each of FIG. 1A to FIG. 1C, the oxidized form (decolored state) of a cathodic EC material is represented by reference symbol C, and the reduced form (colored state) of the cathodic EC material is represented by reference symbol C.

FIG. 1A is a view for illustrating a coloring process for the EC element. When a coloring voltage is applied between the anode (first electrode 1) and the cathode (second electrode 2), the oxidation reaction of the anodic EC material represented by the following (α) progresses in the first electrode 1, and the reduction reaction of the cathodic EC material represented by the following (β) progresses in the second electrode 2.

  (α)

  (β)

The progress of those reactions brings the EC cell into a colored state.

FIG. 1B is a view for illustrating a decoloring process serving as a process opposite to the coloring process. When the EC cell is decolored, through the application of a decoloring voltage (e.g., 0 V achieved through short-circuiting between the first electrode 1 and the second electrode 2) between the first electrode 1 and the second electrode 2, reactions reverse to the reactions illustrated in FIG. 1A progress as indicated by the arcuate arrows in FIG. 1B. Thus, the EC materials in the colored states can be returned to the decolored states. That is, the anodic EC material can be brought into the reduced state A, and the cathodic EC material can be brought into the oxidized state C.

When the reactions illustrated in FIG. 1A and FIG. 1B are repeated, the charge balance of the EC element is normal, and the element normally repeatedly changes between the colored state and the decolored state.

Meanwhile, as the EC element is driven, the charge balance may be lost when a step except the normal coloring/decoloring step is partly performed. There are a few causes for losing the charge balance. The deterioration of the oxidized form ($A^+$) of the anodic EC material is described as an example with reference to FIG. 1C. When the oxidized form $A^+$ of the anodic EC material that is colored through the normal coloring step is deteriorated and cannot react at the first electrode 1 any longer, at the second electrode 2, the reduced form $C^-$ of the cathodic EC material loses the recipient of the electrons thereof and cannot react any longer. In the following description, such phenomenon is hereinafter referred to as loss of charge balance, that is, charge imbalance. As a result of the occurrence of the charge imbalance, a decoloring failure occurs in the EC element in which the colored form $C^-$ of the cathodic EC material remains although the cathodic EC material is normal.

An irreversible electron transfer reaction (in particular, electrode reaction) of a substrate forming the redox reactions is a cause of the charge imbalance. Specific examples thereof include: impurities (such as impurities derived from the EC materials, environmental impurities (e.g., oxygen and water), and impurities derived from a sealing material); and a chemical reaction between radicals. Examples thereof include: the remaining of the colored form of the anode material due to the irreversible reduction reaction of oxygen that has penetrated as an impurity; and the remaining of the colored form of the cathode material due to the irreversible oxidation reaction of a sealing material-containing component.

7. EC Element

Figure 2:
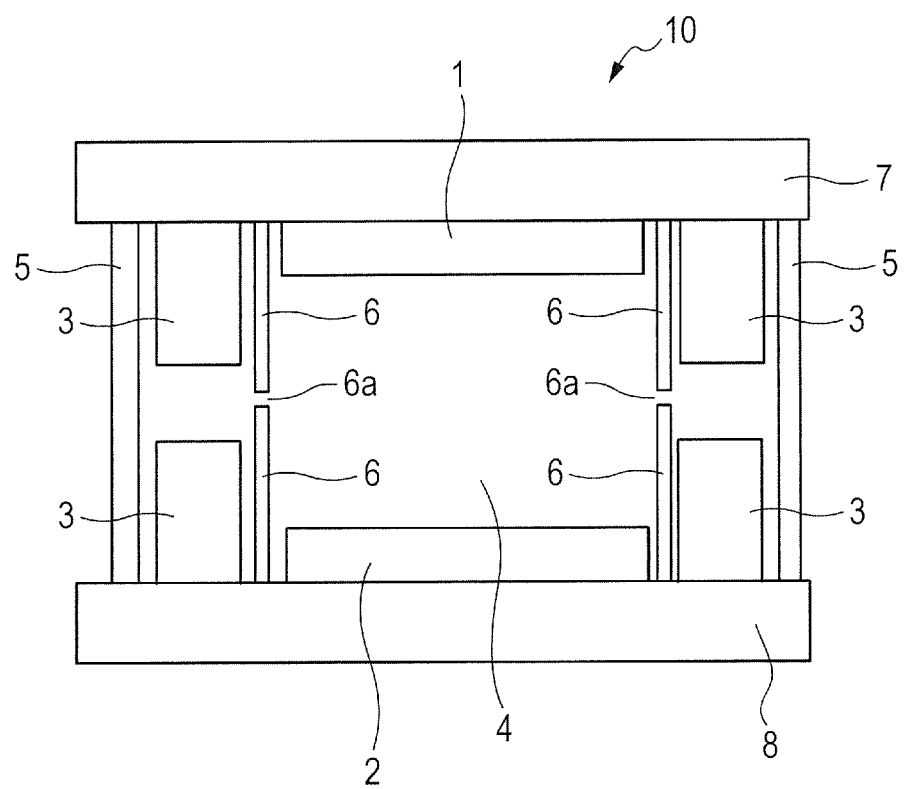
FIG. 2 is a schematic sectional view for illustrating an example of an EC element according to an embodiment of the present invention.

FIG. 2 is a schematic sectional view for illustrating an example of an EC element according to an embodiment of the present invention. An EC element 10 of FIG. 2 includes: a substrate (first substrate 7) having the first electrode 1 and a carrier 3; and a substrate (second substrate 8) having the second electrode 2 and the carrier 3. In the EC element 10 of FIG. 2, an electrolyte 4 is arranged between the first electrode 1 and the second electrode 2, and the electrolyte 4 is in contact with the first electrode 1, the second electrode 2, and the carrier 3. The electrolyte 4 is preferably held while being isolated from the outside by a sealing material 5. In addition, in the present invention, a partition wall 6 illustrated in FIG. 2 may be arranged between each of the first electrode 1 and the second electrode 2, and the carrier 3 as required for the purpose of limiting substance transportation between each of the first electrode 1 and the second electrode 2, and the carrier 3. In addition, in the EC element of the present invention, an anodic redox substance and a cathodic redox substance are each mixed with the electrolyte 4. The term "mixed" as used herein preferably means dissolution. In the present invention, at least one of the anodic redox substance or the cathodic redox substance mixed with the electrolyte 4 is an EC material.

Each constituent component of the electrochromic element of the present invention is described below.

(1) Substrates 7, 8/Electrodes 1, 2

(1-1) Substrates 7, 8

Examples of the substrates (7, 8) constituting the EC element 10 include transparent substrates each made of glass or a polymer compound.

(1-2) First Electrode 1 and Second Electrode 2

At least one of the first electrode 1 and the second electrode 2 is a transparent electrode. The term "transparent" as used herein means a property in which the corresponding electrode transmits light, and it is preferred that the transmittance of light be 50% or more and 100% or less. The reason for the foregoing is that, when at least one of the first electrode 1 and the second electrode 2 is a transparent electrode, light can be efficiently taken in from the outside of the EC element to interact with molecules of the EC material, thereby enabling reflection of optical characteristics of the EC molecules on emitted light. In addition, the term "light" as used herein means light in a wavelength region targeted by the EC element. For example, when the EC element is used as a filter of an image pickup apparatus for a visible light region, light in the visible light region is targeted, and when the EC element is used as a filter of an image pickup apparatus for an infrared region, light in the infrared region is targeted.

As the transparent electrodes, there can be used electrodes obtained by forming a conductive layer of, for example, a transparent conductive oxide or dispersed carbon nanotubes on the above-mentioned transparent substrates (7, 8), transparent electrodes obtained by partly arranging metal wires on the transparent substrates (7, 8), or combinations thereof.

Examples of the transparent conductive oxide include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Of those, FTO excellent in heat resistance, reduction resistance, and conductivity, or ITO excellent in conductivity and transparency is preferred. When a porous electrode is formed, the transparent conductive oxide preferably has high heat resistance because the electrode is calcined.

When the electrode is formed of the transparent conductive oxide, its thickness is preferably from 10 nm to 10,000 nm. A transparent conductive oxide layer having a thickness of from 10 nm to 10,000 nm, the layer being formed of FTO or ITO, is particularly preferred. This is because the layer can achieve both high permeability and chemical stability.

The layer of the transparent conductive oxide may have a construction in which sublayers of the transparent conductive oxide are laminated. Thus, high conductivity and high transparency are easily achieved.

The metal wires that may be arranged on the substrates (7, 8) are not particularly limited, but wires formed of electrochemically stable metal materials, such as Ag, Au, Pt, and Ti, are preferably used. In addition, with regard to a pattern of arranging the metal wires, a grid-like pattern is preferably used. The electrode having the metal wires is typically a planar electrode, but a curved electrode may also be used as required.

A preferred electrode is selected as an electrode except the transparent electrode out of the first electrode 1 and the second electrode 2 in accordance with the applications of the EC element. For example, when the EC element 10 of FIG. 2 is a transmission-type EC element, both the first electrode 1 and the second electrode 2 are each preferably the transparent electrode. Meanwhile, when the EC element 10 of FIG. 2 is a reflection-type EC element, one of the first electrode 1 and the second electrode 2 is the transparent electrode, and the other is an electrode that reflects incident light. Meanwhile, the formation of a reflective layer or a scattering layer between the electrodes can increase the degrees of freedom of the optical characteristics of the electrode except the transparent electrode. For example, when the reflective layer or the scattering layer is introduced between the electrodes, an opaque electrode or an electrode that absorbs light can also be used as an electrode located rearward of the layer without affecting emitted light.

Irrespective of which mode of element the EC element of the present invention is, it is preferred to use, as a constituent material for each of the first electrode 1 and the second electrode 2, a material that is stably present in an environment in which the EC element is operated, and that can allow a redox reaction to progress quickly in response to the application of a voltage from the outside.

In the present invention, a distance (interelectrode distance) between the first electrode 1 and the second electrode 2 is preferably 1 μm or more and 500 μm or less. A large interelectrode distance has an advantage in that the EC material can be arranged in an amount large enough to cause the EC element to effectively function. Meanwhile, a short interelectrode distance has an advantage in that a fast response speed can be achieved.

(1-3) Carrier

The EC element of the present invention includes the carrier 3 in addition to the electrodes (1, 2). As described in the section "Charge Balance/Imbalance," in the complementary EC element in which the anodic redox substance and the cathodic redox substance are used together, and one of these redox substances is an EC material, when a charge imbalance state occurs, the state may be sensed as a decoloring failure irrespective of which one of the anodic and cathodic charge imbalances the state is. In such case, even when an attempt is made to suppress the decoloring failure (color remaining) by setting a voltage to be applied between the first electrode 1 and the second electrode 2 to a voltage opposite in polarity to that at the time of coloring, the attempt does not become an effective suppressive measure because an EC material opposite in polarity is merely colored. The term "EC material opposite in polarity" as used herein refers to a cathodic EC material when the color of an anodic EC material remains, or refers to an anodic EC material when the color of a cathodic EC material remains.

In view of the foregoing, in the present invention, an attempt has been made to adjust the quantity of charge to be used in a redox reaction occurring at the time of coloring/decoloring in an EC layer arranged between the first electrode 1 and the second electrode 2, the charge passing both the electrodes (1, 2) at the time of the redox reaction, through the use of the carrier 3 having a redox substance. The adjustment of the quantity of the charge is called the adjustment of charge balance, i.e., charge rebalancing.

In the present invention, a member that is not an electrode, the member having a redox substance needed for performing the charge rebalancing, is used as the carrier 3. An inorganic compound or an organic compound can be used as the redox substance of the carrier 3 without any particular limitation as long as the compound can repeatedly perform a redox reaction in a desired potential range. Of those, the organic compound is preferably used in terms of adaptability to the use environment of the EC material to be used in combination therewith. In addition, in the present invention, the number of kinds of the redox substances of the carrier 3 may be one, or may be two or more.

The following operation is preferably performed: the redox state of the redox substance of the carrier 3 is brought into a state in which an oxidized form and a reduced form are mixed. The foregoing operation can be described as described below. In the case where the redox state of the redox substance of the carrier 3 is the oxidized form alone or the reduced form alone, the redox substance can correct charge of such polarity as to cause one of the anodic and cathodic charge imbalances. This case is preferred because the charge imbalance of one polarity can be corrected to a large extent as long as the total amount of the redox substance is the same. Meanwhile, the case where the oxidized form and the reduced form are in a state of being mixed is preferred because the redox substance can correct the charge irrespective of which one of the anodic and cathodic charge imbalances the polarity of the charge causes. The following approaches can each be used as a method of forming the state in which the oxidized form and the reduced form are mixed in this case.

1. Anodic and cathodic redox substances are used as a plurality of redox substances. This case is preferred because a redox substance corresponding to the anodic EC material and a redox substance corresponding to the cathodic EC material can each be prepared.

2. A state in which the oxidized form and reduced form of one kind of redox substance are mixed is formed. This case is preferred because the number of kinds of the redox substances to be prepared is small. In addition, in each of the cases, the state can be formed by: an approach involving fixing the redox substance in a state in which the oxidized form and the reduced form are mixed from the beginning to the carrier; or an approach involving fixing the redox substance in the state of the oxidized form or the reduced form to the carrier once and then partially reducing or oxidizing the substance.

The redox substance of the carrier 3 may be an EC redox substance, or may be a non-EC redox substance. If the carrier 3 is present in the optical path of light entering the EC element 10, the non-EC redox substance is preferably used for reducing an influence of the absorption of the light by the redox substance. Meanwhile, when the carrier 3 is arranged outside the optical path of the light entering the EC element 10, the EC redox substance is preferably used because the degree of the charge rebalancing can be detected by the degree of coloring by the EC property of the redox substance.

Examples of the redox substance of the carrier 3 can include a metal complex compound and an EC material. Specific examples of the metal complex compound can include metal complexes each having Os, Fe, Ru, Co, Cu, Ni, V, Mo, Cr, Mn, Pt, Rh, Pd, or Ir as a metal ion. More specific examples thereof can include a metallocene compound, a metal complex using a heterocyclic compound as a ligand, and Prussian blue. Examples of the heterocyclic compound serving as the ligand of the metal complex can include bipyridine, terpyridine, and phenanthroline. An EC material to be described later can be particularly preferably used as the EC material.

A relationship between the redox substance of the carrier 3, and the EC material incorporated between the first electrode 1 and the second electrode 2 can be described as described below. When an anodic EC material is incorporated, the reduced form of the redox substance of the carrier 3 is more easily oxidized than the reduced form of the anodic EC material. In addition, when a cathodic EC material is incorporated, the oxidized form of the redox substance of the carrier 3 is more easily reduced than the oxidized form of the cathodic EC material. In addition, when both the anodic EC material and the cathodic EC material are incorporated, the reduced form of the redox substance of the carrier 3 is more easily oxidized than the reduced form of the anodic EC material, and the oxidized form of the redox substance of the carrier 3 is more easily reduced than the oxidized form of the cathodic EC material.

The reason why the relationship is important is described below. When the charge balance of the EC element is lost, the balance is basically tilted toward one of the anode and the cathode. In the case where the charge balance is tilted toward the anode (the anodic EC material remains while being colored even when the element is brought into a typical decolored state), the charge rebalancing is performed by supplying an electron to the oxidized form of the anodic EC material. In this case, the following relationship is needed for performing the charge rebalancing with the redox substance of the carrier 3: the reduced form of the redox substance of the carrier 3 is more easily oxidized than the reduced form of the anodic EC material. Meanwhile, in the case where the charge balance is tilted toward the cathode (the cathodic EC material remains while being colored even when the element is brought into the typical decolored state), the charge rebalancing is performed by removing an electron from the reduced form of the cathodic EC material. In this case, the following relationship is needed for performing the charge rebalancing with the redox substance of the carrier 3: the oxidized form of the redox substance of the carrier is more easily reduced than the oxidized form of the cathodic EC material.

In addition, bringing the redox substance of the carrier 3 not into a state in which the substance is dissolved in the electrolyte 4 (the substance is incorporated between the first electrode 1 and the second electrode 2 together with the electrolyte 4) but into a state in which the carrier 3 has the substance (the substance is fixed thereto) exhibits the following effect. When the carrier 3 has the substance (the substance is fixed thereto), in ordinary cases, the redox substance does not reach the first electrode 1 or the second electrode 2 configured to cause the driving of the EC element, i.e., the electrochemical reaction of the EC material at the electrode to progress. Accordingly, the redox substance does not consume charge that should originally be used in the reaction of the EC material. However, the foregoing is predicated on the condition required in the present invention that the reduced form of the redox substance is more easily oxidized than the reduced form of the anodic EC material and/or the oxidized form of the redox substance is more easily reduced than the oxidized form of the cathodic EC material. This is because the condition means, in other words, that when an attempt is made to subject the anodic EC material and/or the cathodic EC material to a coloring reaction, the reduced form and/or oxidized form of the redox substance more easily undergoes the reaction than the respective EC materials. That is, this is because of the following reason: when the redox substance of the carrier 3 reaches any other electrode (1, 2), the reduced form or oxidized form of the redox substance more easily undergoes the reaction than the decolored form of the EC material, and hence easily consumes the charge that should be used in the reaction of the EC material. The foregoing is not preferred because a reduction in coloring/decoloring contrast of the EC element, an increase in charge quantity (electric power) needed for the driving, and a reduction in response speed of the EC element occur owing to an increase in quantity of charge that does not contribute to the coloring. In addition, in the case where the redox substance directly transfers an electron to the colored form of the EC material to decolor the material, when the redox substance is dissolved in the electrolyte 4, the transfer of the electron in the electrolyte 4 increases the probability that the colored form of the EC material and the redox substance collide with each other. As a result, a reduction in coloring density of the EC material occurs. The foregoing is not preferred because the reduction in coloring/decoloring contrast of the element, the increase in charge quantity (electric power), and the reduction in response speed similarly occur. Further, the redox substance includes many materials having EC properties. The case where any such EC redox substance is dissolved in the electrolyte 4 is not preferred because absorption characteristics for light entering the EC element are changed by the redox reaction of the redox substance, and the change affects the color, transmittance, and the like of the EC element. The foregoing can be prevented as follows: the carrier 3 has the redox substance and the carrier 3 is arranged so as to deviate from the optical path of the light to be transmitted through the EC element.

In the present invention, when the EC element 10 contains the anodic EC material, the reduced form of the redox substance of the carrier 3 is more easily oxidized than the reduced form of the anodic EC material. In addition, when the EC element 10 contains the cathodic EC material, the oxidized form of the redox substance of the carrier 3 is more easily reduced than the oxidized form of the cathodic EC material. A method of judging the difference in ease of the oxidation or the reduction is described below.

(1-3a) Method Based on Direct Electron Transfer Reaction

A method to be described below is a method involving bringing the oxidized form of the anodic EC material or the reduced form of the cathodic EC material into direct contact with the corresponding redox substance. Specifically, the corresponding redox substance is loaded into the electrolyte having dissolved therein the oxidized form of the anodic EC material or the reduced form of the cathodic EC material. At this time, when the anodic EC material is incorporated into the electrolyte, at least the reduced form of the redox substance is loaded, and when the cathodic EC material is incorporated into the electrolyte, at least the oxidized form of the redox substance is loaded. When the colored form, i.e., the oxidized form of the anodic EC material or the reduced form of the cathodic EC material is decolored as a result of the loading of the redox substance, the following facts are found. That is, it is shown that when the anodic EC material is decolored, the transfer of an electron from the reduced form of the redox substance to the oxidized form of the EC material occurs to turn the anodic EC material into the reduced form. The foregoing means that the reduced form of the redox substance of the carrier 3 is more easily oxidized than the reduced form of the anodic EC material. It is also shown that when the cathodic EC material is decolored, the transfer of an electron from the reduced form of the EC material to the oxidized form of the redox substance occurs to turn the cathodic EC material into the oxidized form. The foregoing means that the oxidized form of the redox substance of the carrier 3 is more easily reduced than the oxidized form of the cathodic EC material. In addition, when the redox substance of the carrier 3 is an EC substance, the decoloring and color change of the EC materials can be observed. The decoloring of the EC material as used herein is the decoloring of the EC material that the carrier 3 does not have. In addition, the color change of the EC material is the absorption change of the EC redox substance of the carrier 3.

(1-3b) Method Based on Electron Transfer Reaction (Direct Reaction and Reaction Through Carrier 3)

A method to be described below is a method involving bringing the electrolyte containing the oxidized form of the anodic EC material or the reduced form of the cathodic EC material into contact with the carrier having a redox substance. Specifically, the electrolyte having dissolved therein the oxidized form of the anodic EC material or the reduced form of the cathodic EC material is brought into contact with the carrier having the corresponding redox substance. When the colored form, i.e., the oxidized form of the anodic EC material or the reduced form of the cathodic EC material is decolored as a result of the foregoing, it can be said that in addition to the direct electron transfer reaction described in the section (1-3a), an electron transfer reaction through the carrier 3 to be described below progresses. Specifically, in the case of the anodic EC material, the transfer of an electron from the reduced form of the redox substance of the carrier 3 to the carrier 3 occurs, and hence the anodic EC material receives the electron from the carrier 3 to change from the oxidized form (colored state) to the reduced form (decolored state). The occurrence of the reaction means that the reduced form of the redox substance of the carrier is more easily oxidized than the reduced form of the anodic EC material. Meanwhile, in the case of the cathodic EC material, the transfer of an electron from the carrier 3 to the oxidized form of the redox substance of the carrier and the transfer of an electron from the cathodic EC material to the carrier 3 occur. As a result, the cathodic EC material changes from the reduced form (colored state) to the oxidized form (decolored state). The occurrence of the reactions means that the oxidized form of the redox substance of the carrier 3 is more easily reduced than the oxidized form of the cathodic EC material. When the redox substance of the carrier 3 has an EC property, the decoloring and color change of the EC materials can be observed as in the section (1-3a).

(1-3c) Method Based on Measurement of Redox Potential

A method to be described below is a method involving comparing the eases of the oxidation or the reduction based on the redox potentials of the EC material and the redox substance in electrode reactions. Each of the redox potentials can be determined by electrochemical measurement. The potential can be evaluated by, for example, performing the cyclic voltammogram measurement of each of the EC material and the redox substance.

In the measurement, a state in which the half-wave potential of the reversible redox reaction of the redox substance of the carrier 3 is more negative than the half-wave potential of a redox reaction corresponding to an oxidation reaction in which the anodic EC material is reversibly colored means the following. That is, the state means that the reduced form of the redox substance of the carrier 3 is more easily oxidized than the reduced form of the anodic EC material. In addition, in this case, a redox potential $E_{EC}(A)$ of the anodic EC material and a redox potential $E_{RO}$ of the redox substance of the carrier 3 preferably satisfy the following formula (I):

$$E_{RO} < E_{EC}(A) \tag{I}$$

A state in which the half-wave potential of the reversible redox reaction of the redox substance of the carrier 3 is more positive than the half-wave potential of a redox reaction corresponding to a reduction reaction in which the cathodic EC material is reversibly colored means the following. That is, the state means that the oxidized form of the redox substance of the carrier 3 is more easily reduced than the oxidized form of the cathodic EC material. In addition, in this case, a redox potential $E_{EC}(C)$ of the cathodic EC material and the redox potential $E_{RO}$ of the redox substance of the carrier 3 preferably satisfy the following formula (II):

$$E_{RO} > E_{EC}(C) \tag{II}$$

In addition, when the EC element contains the anodic EC material and the cathodic EC material, the formula (I) and the formula (II) are particularly preferably satisfied. That is, the following formula (III) is particularly preferably satisfied among the redox potential $E_{EC}(A)$ of the anodic EC material, the redox potential $E_{EC}(C)$ of the cathodic EC material, and the redox potential $E_{RO}$ of the redox substance of the carrier 3.

$$E_{EC}(C) < E_{RO} < E_{EC}(A) \tag{III}$$

Electrodes to be used at the time of the performance of the cyclic voltammogram measurement are described below. The same electrode as an electrode to be used in the EC element can be used as a working electrode. For example, when the electrode of the EC element is ITO, ITO can be used. A platinum electrode having a sufficient area is preferably used as a counter electrode. The carrier constituting the EC element of the present invention can be used as it is. In addition, a solvent to be used in the EC element is preferably used as a solvent or a support to be used at the time of the performance of the cyclic voltammogram measurement. The scan speed of a voltammogram is preferably set to from 20 mVs$^{-1}$ to 200 mVs$^{-1}$.

The difference in ease of the oxidation or the reduction can be measured and evaluated by any one of the three kinds of methods, but in particular, the method of the section (1-3b) (method based on an electron transfer reaction through an electrode) is most preferred because the method is simple and can directly observe an effect.

A relationship between the redox substance of the carrier 3, and each of the anodic redox substance (including an EC material) and the cathodic redox substance (including an EC material) incorporated between the first electrode 1 and the second electrode 2 is desirably the following relationship.

When the anodic EC material and the EC or non-EC cathodic redox substance are used, it is preferred that the oxidized form of the redox substance of the carrier 3 be more easily reduced than the oxidized form of the cathodic redox substance. In addition, when the cathodic EC material and the EC or non-EC anodic redox substance are used, it is preferred that the reduced form of the redox substance of the carrier 3 be more easily oxidized than the reduced form of the anodic redox substance.

In contrast, the following case is considered: when the redox substance of the carrier 3 is used together with the cathodic redox substance, the oxidized form of the redox substance of the carrier 3 is less easily reduced than the oxidized form of the cathodic redox substance. In this case, when cathodic charge imbalance occurs in the EC element 10 to cause the reduced form of the cathodic redox substance to remain in the element, the transfer of an electron from the cathodic redox substance to the oxidized form of the redox substance of the carrier 3 does not occur. This is because the redox substance of the carrier 3 does not contribute to charge rebalancing. In addition, the following case is considered: when the redox substance of the carrier 3 is used together with the anodic redox substance, the reduced form of the redox substance of the carrier 3 is less easily oxidized than the reduced form of the anodic redox substance. In this case, when anodic charge imbalance occurs in the EC element 10 to cause the oxidized form of the redox substance to remain in the element, the anodic redox substance cannot receive an electron from the redox substance of the carrier 3. This is because the redox substance of the carrier 3 does not contribute to the charge rebalancing.

A method of judging a difference in ease of oxidation or reduction between the anodic redox substance or the cathodic redox substance and the redox substance of the carrier 3 can be considered in the same manner as in the EC material. In the case of a non-EC redox substance, even when the substance does not have any EC property in a target wavelength region, its absorption characteristics change in a wavelength region deviating from the target.

Accordingly, the difference can be measured and evaluated by using the approach of the section (1-3a) or (1-3b) instead of the approach of the section (1-3c) through the measurement and evaluation of the changes in absorption characteristics.

In the EC element of the present invention, the range in which the charge rebalancing can be performed is proportional to the amount of the redox substance of the carrier 3. That is, as the amount of the redox substance increases, the range in which the charge rebalancing can be performed also increases. Accordingly, it is basically preferred that the amount of the redox substance of the carrier 3 be as large as possible to the extent that no problems occur in the practical use of the element. An effective approach to increasing the amount of the redox substance to be fixed to (incorporated into) the carrier 3 is, for example, an increase in surface area of an electrode. In order that an increase in surface area of the carrier 3 may be achieved while an element size suitable for an actual construction is achieved, the carrier 3 preferably has a porous structure. The porous structure is, for example, a structure having an effective area (roughness factor) 10 or more times, preferably 100 or more times as large as its projected area.

A constituent material for the carrier 3, which is not particularly limited, is preferably a material having, or capable of forming, a porous structure. Examples of the material having, or capable of forming, a porous structure include inorganic oxides (such as a metal oxide, silicon oxide, a carbon material, and a metal material) and organic compounds (such as a polymer). A hybrid material obtained by combining a plurality of kinds of those materials (e.g., one kind of inorganic compound and one kind of organic compound), e.g., a film-like material can be used. In addition, when the carrier 3 is arranged so as to deviate from the optical path of light taken in by the EC element, for example, a material that scatters the light, a porous material that is not transparent, the carbon material, or the metal material, such as platinum or titanium, can be used. From the viewpoint of realizing a large effective area with a small projected area and of manufacture, it is preferred that the porous structure of the carrier 3 have a nanometer-scale fine structure. The shape and the manufacturing method of the porous structure are not limited, and a nanoparticle film having communication holes, or a nanostructure, such as a nanorod, a nanowire, or a nanotube, can be used. Of those, a particle film that has a large specific surface area per volume and is easy to manufacture is suitably used. With regard to the size of the particle to be used in forming the particle film, particles having an average particle diameter of desirably 300 nm or less, preferably 50 nm or less are used.

In the present invention, the thickness of the carrier 3 is desirably 100 nm or more, preferably 1 µm or more.

Next, the arrangement of the carrier 3 is described below. The EC element of the present invention includes the two kinds of electrodes (1, 2) and the carrier 3. Arrangement generally known as the arrangement of the electrodes of an EC element can be used for the electrodes (1, 2) out of those components. A typical example thereof is an arrangement system in which an interelectrode distance of from about 1 µm to about 500 µm to be described later is set so that the first electrode 1 and the second electrode 2 formed on the substrates (7, 8) may be opposite to each other. The arrangement of the carrier 3 is described later.

When light is introduced into the EC element of the present invention, a specific method for the introduction can be freely selected in accordance with the applications of the EC element. Typical examples thereof are described below.

In the case of a transmission-type EC element in which the first electrode 1 and the second electrode 2 are opposite to each other, incident light is transmitted through the first electrode 1 or the second electrode 2. When the EC material in the EC element is in a colored state, at least part of the light is absorbed by the EC material, and the remaining light is transmitted through the other electrode to be emitted. Meanwhile, in the case of a reflection-type EC element in which the first electrode 1 and the second electrode 2 are opposite to each other, the incident light is transmitted through the first electrode 1 or the second electrode 2. When the EC material in the EC element is in a colored state, at least part of the light is absorbed by the EC material, and the remaining light is turned back by a reflector, a scatterer, or the like and is transmitted through the electrode that has transmitted the light at the time of its incidence to be emitted. At this time, the reflector, the scatterer, or the like is often arranged between the first electrode 1 and the second electrode 2, but a construction in which the reflector, the scatterer, or the like is arranged outside the electrode opposite to the electrode that transmits the light at the time of the incidence can also be selected.

One remarkable feature of an EC element as compared to a liquid crystal element of a generally prevailing light absorbing device is that the maximum transmittance thereof is high. In order to make use of the high transmittance, it is desired that the number of elements that reduce the transmittance except absorption by the EC materials when colored be as small as possible in an optical path of light entering the EC cell until the light is emitted. When the carrier 3 constituting the EC element of the present invention is arranged in the optical path, the carrier 3 may also serve as an element for reducing the transmittance of the EC element. Specifically, preferred arrangement is as described below. The carrier 3 has an effective area larger than those of the first electrode 1 and the second electrode 2, and when an attempt is made to achieve the large effective area with a small projected area, the carrier 3 desirably has a porous structure. However, when a constituent material for an electrode having a porous structure is a material having a low transmittance (for visible light) as a bulk, such as a metal or carbon, the transmittance may be significantly reduced by the electrode. In addition, even if a material having a high bulk transmittance is used, when there is a difference in refractive index between the carrier 3 and the electrolyte 4, the transmittance may be reduced by scattering or the like. In view of the foregoing, according to the present invention, it is more preferred that the carrier 3 be arranged outside an optical path of light that is transmitted through at least one of the first electrode 1 or the second electrode 2. The phrase "outside an optical path" as used herein means a state of being out of an optical path of light necessary for the application of the EC element serving as a light absorbing element from the foregoing viewpoint. For example, when the EC element is used as a transmission-type filter of an image pickup apparatus, the optical path as used herein refers to an optical path of, among the entire light that is transmitted through the EC element, light that reaches a region used for necessary image pickup among the entire region of a light-receiving element (for example, CCD sensor and CMOS sensor). On the other hand, in the same case, even if the light is transmitted through the EC element, if the light reaches a region except the region used for necessary image pickup of the light-receiving element, the optical path of such light is "outside an optical path" as used herein. In the present invention, the carrier 3 is arranged outside the optical path and hence the constituent material for the carrier 3 can be selected with a high degree of freedom as described above. In addition, even when the redox substance of the carrier 3 is an EC substance, the substance can be used without any problem.

Figure 3A:
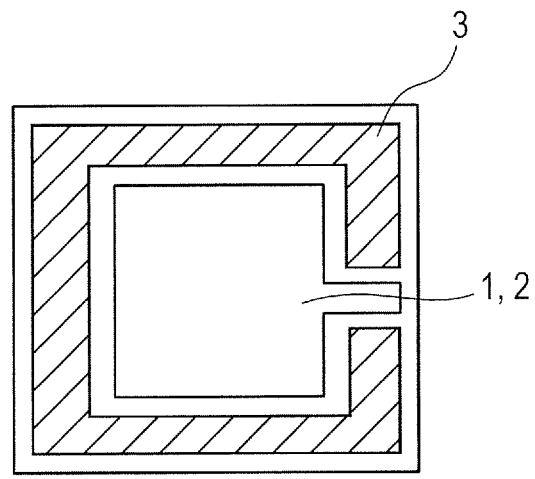
FIG. 3A, FIG. 3B, and FIG. 3C are each a schematic top view of the EC element of the present invention.
Figure 3B:
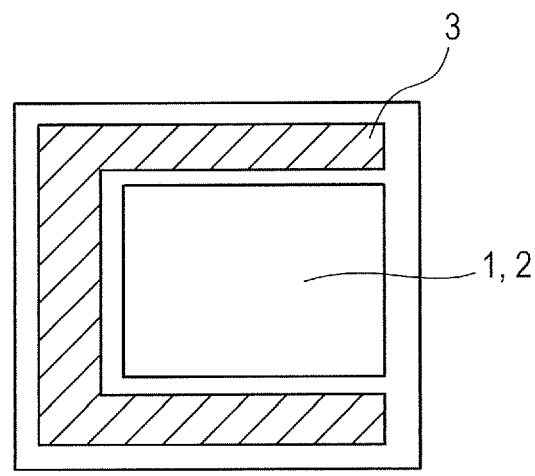
Figure 3C:
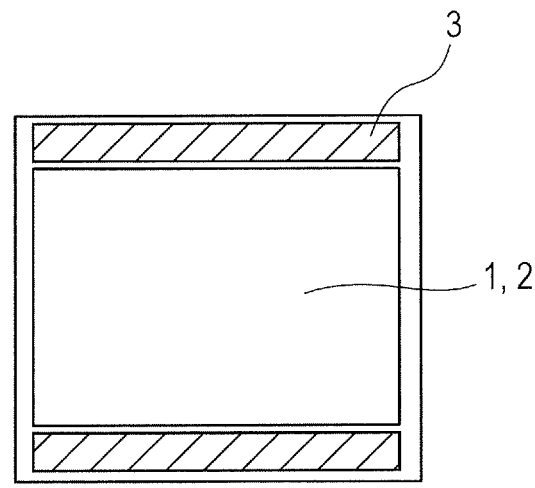

Next, the position at which the carrier 3 is arranged in the present invention is described. When the amount of the remaining colored form of the EC material is reduced on the first electrode 1 and/or the second electrode 2 for suppressing a decoloring failure, it is desired that the reaction can be uniformly performed on the electrode. From the foregoing viewpoint, the carrier 3 is preferably arranged in at least part of the peripheries/periphery of the first electrode 1 and/or the second electrode 2 as illustrated in, for example, each of FIG. 3A to FIG. 3C. FIG. 3A to FIG. 3C are each a top view for illustrating an example of the EC element of the present invention. In each of FIG. 3A to FIG. 3C, the first electrode 1 and the second electrode 2 appear to overlap each other. The carrier 3 may be arranged so as to surround four sides of each of the first electrode 1 and the second electrode 2 as illustrated in FIG. 3A, or may be arranged so as to surround three sides of each of the first electrode 1 and the second electrode 2 as illustrated in FIG. 3B. In addition, the carrier 3 may be arranged so as to surround two sides of each of the first electrode 1 and the second electrode 2 as illustrated in FIG. 3C.

The carrier 3 can be caused to function as a place for reserving charge for electrochemically subjecting the EC material, which remains as a colored form on the first electrode 1 and/or the second electrode 2 at the time of the occurrence of the decoloring failure of the EC element 10, to a decoloring reaction. Accordingly, it is desired that the EC material normally colored at the time of, for example, its coloring be prevented from reaching the carrier 3. In the EC element 10 of the present invention, the EC material can freely diffuse in the electrolyte 4. Accordingly, when the material reaches the carrier 3, the transformation of the colored form into a decolored form may occur. An effective method for the suppression of the transformation is a reduction in substance transportation between the first electrode 1 and/or the second electrode 2 where the coloring is performed, and the carrier 3. Specific examples thereof include: an increase in distance between the electrode and the carrier; and the arrangement of a structure configured to reduce the substance transportation, such as the partition wall 6 illustrated in FIG. 2. In the case of the former method, specifically, the distance between the first electrode 1 and/or the second electrode 2, and the carrier is made larger than a distance between the first electrode 1 and the second electrode 2. In addition, the latter method is, for example, a method involving forming the partition wall 6 having an opening portion 6a illustrated in FIG. 2 between the first electrode 1 and/or the second electrode 2, and the carrier 3. The partition wall 6 itself is preferably of a porous structure. It is because the substance transportation between the first electrode 1 and/or the second electrode 2, and the carrier needs to be secured for causing the carrier 3 to effectively function that the partition wall 6 having the opening portion 6a is arranged.

The carrier 3 can be formed through, for example, the following steps:
(A) the step of removing part of the conductive layer of a conductive substrate forming the first electrode 1 or the second electrode 2 through etching or the like;
(B) the step of forming the carrier 3 serving as a porous film in a region from which the conductive layer has been removed; and
(C) the step of fixing the redox substance to the carrier 3.

Any one of the steps (A), (B), and (C) may be performed first. In addition, the carrier 3, which needs only to be formed on one of the substrates on which the first electrode 1 and the second electrode 2 are arranged, may be formed on each of both the substrate on which the first electrode 1 is arranged and the substrate on which the second electrode 2 is arranged.

(2) Sealing Material 5

The substrates (7, 8) constituting the EC element are preferably joined to each other with the sealing material 5 while being arranged so that the electrode surface of the first electrode 1 and the electrode surface of the second electrode 2 may be opposite to each other. The sealing material 5 is preferably a material having the following features: the characteristics of the material after sealing are stable against, and are not affected by, the electrolyte 4; the material is electrochemically stable and hence does not cause any electrochemical reaction at the time of the operation of the EC element; the material is chemically stable; the material has lower permeability to a gas and a liquid; and the material does not inhibit the redox reaction of the EC material. For example, an inorganic material, such as a glass frit, an organic material, such as an epoxy-based resin or an acrylic resin, or a metal can be used. When the characteristics after the sealing are unstable against the electrolyte 4, for example, the contamination of an electrode by the eluted sealing material is of concern. In addition, when a component of the sealing material 5 is electrochemically unstable, the electrode reaction of the component may be responsible for the occurrence of charge imbalance. In addition, when the material has higher permeability to a gas and a liquid (especially oxygen and moisture), attention needs to be paid because the electrode reactions of the gas and the liquid may be responsible for the occurrence of the charge imbalance.

The sealing material 5 may have a function of retaining the distance between the first electrode 1 and the second electrode 2 by, for example, containing a spacer material. When the sealing material 5 does not have a function of specifying the distance between the first electrode 1 and the second electrode 2, the distance between both the electrodes may be retained by separately placing a spacer. An inorganic material, such as silica beads or glass fibers, or an organic material, such as a polyimide, a polytetrafluoroethylene, a polydivinylbenzene, a fluorine rubber, or an epoxy resin, can be used as a material for the spacer. The spacer can specify and retain the distance between the first electrode 1 and the second electrode 2 constituting the EC element 10.

(3) Electrolyte 4

The EC element of the present invention includes, between the first electrode 1 and the second electrode 2, the electrolyte 4, and the anodic organic EC material and/or the cathodic organic EC material mixed with the electrolyte 4. In the present invention, the anodic organic EC material and the cathodic organic EC material are preferably dissolved in the electrolyte 4. The case where the anodic organic EC material and the cathodic organic EC material are dissolved in the electrolyte is advantageous as compared to the case where the materials are each fixed to an electrode in terms of the following two points: (A) a limiting factor, i.e., the surface area of the electrode to which any such EC material is fixed is eliminated and hence the amount of the EC material that can be caused to exist in the electrolyte is large; and (B) in the case where the fixation is performed, structural contrivances and production steps are often needed for both the EC material to be fixed and an electrode serving as a fixing carrier, but in the case where the EC materials are dissolved, the contrivances and the steps are eliminated.

The electrolyte 4 as used herein includes both concepts of the electrolyte itself and an electrolyte solution in which the electrolyte is dissolved in a solvent. As the electrolyte 4, for example, one prepared by dissolving a salt compound in a solvent, or an ionic liquid in which the salt compound itself can also serve as the solvent can be used.

The solvent for forming the electrolyte is selected depending on the application in consideration of, for example, the solubilities of solutes including the EC molecules, vapor pressures, viscosities, and potential windows, and is preferably a solvent having polarity. Specific examples thereof include organic polar solvents, such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methylpyrrolidinone, and dioxolane, water, and a mixture thereof. Of those, a cyclic ester compound or a nitrile compound is preferably used, and propylene carbonate is most preferably used among those compounds.

The solvent may further contain a polymer or a gelling agent to make the solvent a highly viscous one or a gel-like one. The polymer which may be contained in the solvent is not particularly limited. Examples thereof include polyacrylonitrile, carboxymethylcellulose, polyvinyl chloride, polyethylene oxide, polypropylene oxide, polyurethane, polyacrylate, polymethacrylate, polyamide, polyacrylamide, polyester, and Nafion (trade name). The polymer or the gelling agent is preferably subjected to addition of a functional group in order to improve its characteristics. Specific examples thereof may include a cyano group, a hydroxy group, an ester, an ether, an amide, an amino group, a carboxylic acid group, and a sulfonic acid group.

The salt compound to be used for the electrolyte is not particularly limited as long as the salt compound is an ion dissociative salt, shows satisfactory solubility in the solvent and high compatibility with a solid electrolyte, and is stable at the operation potential of the electrochromic element. Suitable ions selected from various cations and anions may be used in combination. Examples of the cations include: metal ions, such as an alkali metal ion and an alkaline earth metal ion; and organic ions, such as a quaternary ammonium ion. Specific examples thereof may include ions of Li, Na, K, Ca, Ba, tetramethylammonium, tetraethylammonium, and tetrabutylammonium. Examples of the anions include anions of various fluorine compounds and halide ions. Specific examples thereof include $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$. In addition, through use of an EC material that is also a salt compound, a solution of the EC material can also serve as an electrolyte solution. An example of the EC material that is also the salt compound may be a viologen derivative salt.

When the EC element of the present invention is produced, at the time of the introduction of the electrolyte 4 into the EC element, for example, a method involving injecting the electrolyte 4 into a cell formed by joining the substrates (7, 8) to each other while forming an opening portion in part of the electrodes (1, 2) opposite to each other or the sealing material 5 is available. The method is also applicable when an EC material to be described later is dissolved in the electrolyte 4. In addition, a specific method of introducing the electrolyte 4 into the cell is, for example, a vacuum injection method, an atmospheric injection method, or a meniscus method. Incidentally, after the injection of the electrolyte 4 or the like into the cell, the opening portion is sealed. A dropping attachment method free of any inlet is also preferably used.

(4) EC Material

The EC material to be used in the EC element of the present invention is a low-molecular weight organic compound of such a type as to be colored by the application of an electrical stimulus from the outside. In the present invention, the EC material is preferably a low-molecular weight organic compound having a molecular weight of 2,000 or less, and is preferably a compound that changes from a decolored form to a colored form through an oxidation reaction or a reduction reaction in an electrode. In the EC element of the present invention, one of an anodic EC material and a cathodic EC material is necessarily used.

The term "anodic EC material" as used herein means a material that is colored by an oxidation reaction thereof in which electrons are removed from the material. In contrast, the term "cathodic EC material" as used herein means a material that is colored by a reduction reaction thereof in which electrons are given to the material.

Examples of the anodic EC material include a thiophene derivative, an amine having an aromatic ring (such as a phenazine derivative and a triallylamine derivative), a pyrrole derivative, a thiazine derivative, a triallylmethane derivative, a bisphenylmethane derivative, a xanthene derivative, a fluoran derivative, and a spiropyran derivative. Of those, as the anodic electrochromic molecules, low-molecular-weight thiophene derivatives (such as a monothiophene derivative, an oligothiophene derivative, and a thienoacene derivative) and low-molecular-weight amines each having an aromatic ring (such as a phenazine derivative and a triallylamine derivative) are preferred.

The reason for the foregoing is that the use of those molecules in the electrochromic layer facilitates the provision of an electrochromic element having a desired absorption wavelength profile. Those molecules have an absorption peak in the ultraviolet region in a neutral state, do not exhibit absorption in the visible light region, and are in a decolored state having a high transmittance in the visible light region. Through an oxidation reaction, those molecules are converted into radical cations to shift the absorption to the visible light region, resulting in a colored state. The absorption wavelength of any such molecule and the potential at which the redox reaction progresses can be designed by increasing or decreasing the n-conjugation length thereof or changing a substituent thereof to change the n-conjugated system thereof.

The term "low-molecular weight" as used herein refers to a molecular weight of 2,000 or less, preferably 1,000 or less. A cathodic electrochromic molecule is, for example, a pyridine-based compound, such as a viologen derivative, or a quinone compound. The absorption wavelength of any such molecule and the potential at which the redox reaction thereof progresses can be designed by increasing or decreasing the n-conjugation length thereof, or changing a substituent thereof to change the n-conjugated system thereof.

8. Mechanism for Adjusting Charge Balance

The EC element 10 of the present invention adjusts the charge balance of the EC element 10 by using the carrier 3. In the EC element 10 of the present invention, the carrier has a redox substance, and a difference in ease of oxidation or reduction between the substance and the EC material is specified. Accordingly, charge rebalancing can be performed by utilizing the difference in ease of the oxidation or the reduction. Specific description is given below. The following state is considered: for example, when a short circuit state is established between the first electrode 1 and the second electrode 2 for decoloring the EC element 10, the anodic EC material in the EC element remains while being colored (while being an oxidized form). In this case, anodic charge imbalance occurs. At this time, when the anodic EC material serving as the oxidized form moves to the vicinity of the carrier 3 having the redox substance to establish a state in which the redox substance of the carrier 3 can exchange charge directly or through the carrier 3, the following occurs. An electron is supplied from the reduced form of the redox substance of the carrier 3 to the anodic EC material serving as the oxidized form by virtue of the difference in ease of the oxidation or the reduction between the compounds, and hence the anodic charge imbalance is eliminated. In contrast, a state in which the cathodic EC material in the EC element remains while being colored (while being a reduced form) is considered. In this case, cathodic charge imbalance occurs. At this time, when the cathodic EC material serving as the reduced form moves to the vicinity of the carrier 3 having the redox substance to establish a state in which the redox substance of the carrier 3 can exchange charge directly or through the carrier 3, the following occurs. An electron is supplied from the cathodic EC material serving as the reduced form to the oxidized form of the redox substance of the carrier 3 by virtue of the difference in ease of the oxidation or the reduction between the compounds, and hence the cathodic charge imbalance is dissolved. By the same reason, also in the case of the EC element 10 including the anodic EC material and the cathodic EC material, charge imbalance can be effectively eliminated by using the redox substance of the carrier 3. As described above, in the EC element 10 of the present invention, the charge rebalancing can be performed by the difference in ease of the oxidation or the reduction.

9. Effects

According to the present invention, through use of the carrier 3, a decoloring failure due to charge imbalance in the EC element can be eliminated. As a typical example, the transmittance can be improved through conversion into the decolored form of the colored form of an EC material, which remains even when an operation for maximizing the transmittance of the EC element is performed. For example, a method using redox buffers as disclosed in U.S. Pat. No. 6,188,505 is also a measure against a decoloring failure due to charge imbalance.

However, as described in the "SUMMARY OF THE INVENTION" section, the method using the redox buffers does not eliminate the charge imbalance between display electrodes. Therefore, the ratio of the colored form of the anodic EC material to the colored form of the cathodic EC material cannot be corrected.

In contrast, in the approach of the present invention, i.e., an approach involving using the carrier 3, the lost charge balance between the display electrodes is rebalanced by using the carrier 3 having the redox substance in the adjustment of charge. In other words, the charge balance of the entirety of the EC element does not change, but the carrier 3 having the redox substance takes charge of the charge imbalance between the display electrodes. In this case, when the EC material is colored, only the first electrode 1 and the second electrode 2 are driven without the use of the carrier 3, and hence an excessive colored state due to the charge imbalance is not reproduced. Accordingly, the ratio between the colored bodies of the EC materials can be corrected by using the approach of the present invention.

Figure 4A:
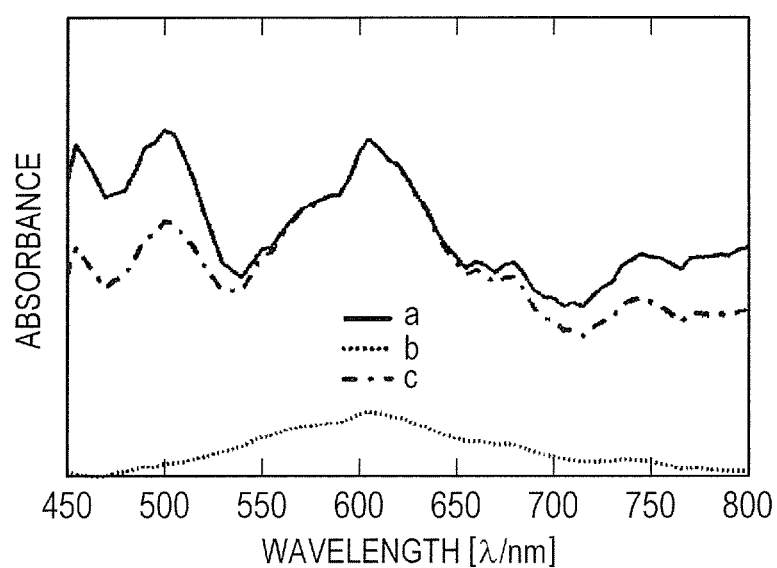
FIG. 4A is a view for showing the absorption spectrum of an EC element that does not correspond to the present invention.
Figure 4B:
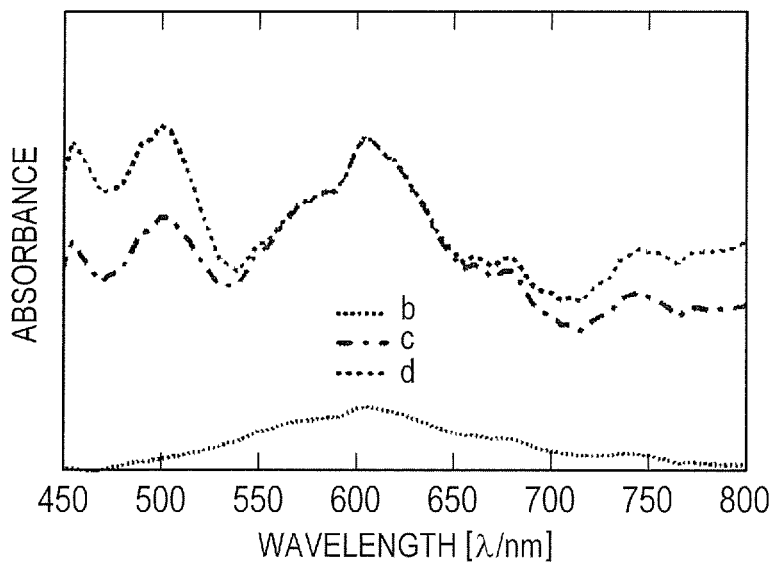
FIG. 4B is a view for showing the absorption spectrum of the EC element of the present invention.

Description is given below with reference to the drawings. FIG. 4A is a view for showing the absorption spectrum of an EC element that does not correspond to the present invention, and FIG. 4B is a view for showing the absorption spectrum of the EC element of the present invention. FIG. 4A and FIG. 4B each show examples of the calculation of the absorption spectrum (axis of ordinate: absorbance, axis of abscissa: wavelength) of an EC element when an anodic EC material and a cathodic EC material are used. The anodic EC material has characteristic absorption peaks at 455 nm and 500 nm, and the cathodic EC material has a characteristic absorption peak at 605 nm. When the charge balance of the EC element is normal, the absorption spectrum of the EC element is represented by a spectrum a in FIG. 4A. An absorption spectrum in the case where the charge balance of the EC element changes in the direction in which the colored form of the cathodic EC material remains is represented by a spectrum b in each of FIG. 4A and FIG. 4B. In this case, the absorption spectrum of the EC element at the time of its coloring is represented by a spectrum c in each of FIG. 4A and FIG. 4B, and the absorbances of the anodic EC material (at 455 nm and 500 nm) reduce as compared to those of the spectrum a in a state in which the charge balance is normal. The change in spectrum due to a change in charge balance cannot be eliminated even when a redox buffer is used. However, in the approach of the present invention, the lost charge balance can be rebalanced, and hence the spectrum in a state in which the charge balance is normal can be retained like a spectrum d in FIG. 4B. The spectrum d in FIG. 4B coincides well with the spectrum a in FIG. 4A, and hence it is shown in FIG. 4A and FIG. 4B that a spectrum in a normal state is retained in the EC element of the present invention.

Accordingly, the approach of the present invention (approach involving using the carrier having the redox substance) can solve problems in the case where a redox buffer is used as in U.S. Pat. No. 6,188,505. That is, the approach can solve an increase in power consumption in the coloring operation of a typical EC element, a reduction in response speed thereof, and a change in ratio between the colored form of the anodic EC material and the colored form of the cathodic EC material.

10. Applications and the Like

The EC element of the present invention can be used as a constituent member for an optical filter, a lens unit, an image pickup apparatus, a window member, or the like.

(Optical Filter)

An optical filter of the present invention includes the EC element of the present invention and an active element electrically connected to the EC element. The active element electrically connected to the EC element is specifically, for example, a transistor for controlling the transmittance of the EC element. Examples of the transistor include a TFT and a MIM element. The TFT is also referred to as "thin-film transistor," and a semiconductor or an oxide semiconductor is used as a constituent material therefor.

(Lens Unit)

A lens unit of the present invention includes an image pickup optical system including a plurality of lenses and an optical filter including the EC element of the present invention. The optical filter constituting the lens unit may be arranged between any one of the plurality of lenses and another lens, or may be arranged outside the lenses. The lens unit of the present invention can adjust the quantity of light that is transmitted through the image pickup optical system or of light that has been transmitted through the system with the optical filter.

(Image Pickup Apparatus)

An image pickup apparatus of the present invention includes an image pickup optical system including a plurality of lenses, an optical filter, and an image pickup element configured to receive light that has been transmitted through the optical filter. The image pickup element constituting the image pickup apparatus is an element configured to receive light that has been transmitted through the optical filter, and is an element also referred to as "light-receiving element."

Specific examples of the image pickup apparatus include a camera, a video camera, and a cellular phone with a camera. The image pickup apparatus may be of a form in which the image pickup optical system is removably mounted, i.e., a main body including the image pickup element and a lens unit including a lens can be separated from each other.

In the case where the main body and lens unit of the image pickup apparatus can be separated from each other, a form in which an optical filter separate from the image pickup apparatus is used at the time of image pickup is also included in the present invention. In such case, the position at which the optical filter is arranged is, for example, as follows: the filter is arranged outside the lens unit, is arranged between the lens unit and the light-receiving element, or is arranged between a plurality of lenses (when the lens unit has the plurality of lenses).

When the EC element of the present invention is used as a constituent member for the image pickup apparatus, the position at which the EC element is arranged is not particularly limited. For example, the element may be arranged in front of the image pickup optical system, or may be arranged just in front of the image pickup element. For example, when the EC element of the present invention is arranged in the optical path of the image pickup optical system connected to the image pickup element, the quantity of light to be received by the image pickup element or the wavelength distribution characteristics of incident light can be controlled. In addition, the image pickup optical system can also be referred to as "lens system." The image pickup optical system is, for example, a lens unit including a plurality of lenses.

In addition, in the case where the EC element of the present invention is used in the image pickup apparatus, the EC element can exhibit high transparency when in a decolored state. Accordingly, a sufficient quantity of transmitted light relative to the incident light is obtained. In addition, when the element is in a colored state, optical characteristics in which the incident light is blocked and modulated with reliability are obtained.

When the image pickup apparatus to which the lens unit is removably mounted includes the optical filter, the optical filter may be arranged so as to be arranged between the lens unit and the image pickup element at the time of the mounting of the lens unit.

When the image pickup apparatus includes the image pickup optical system, the optical filter may be arranged between a lens and another lens, or may be arranged between a lens and the image pickup element. Alternatively, the optical filter may be arranged so that the image pickup optical system may be arranged between the optical filter and the image pickup element.

When the EC element of the present invention is used in the image pickup apparatus, such as a camera, the quantity of light can be reduced without any reduction in gain of the image pickup element.

Figure 5:
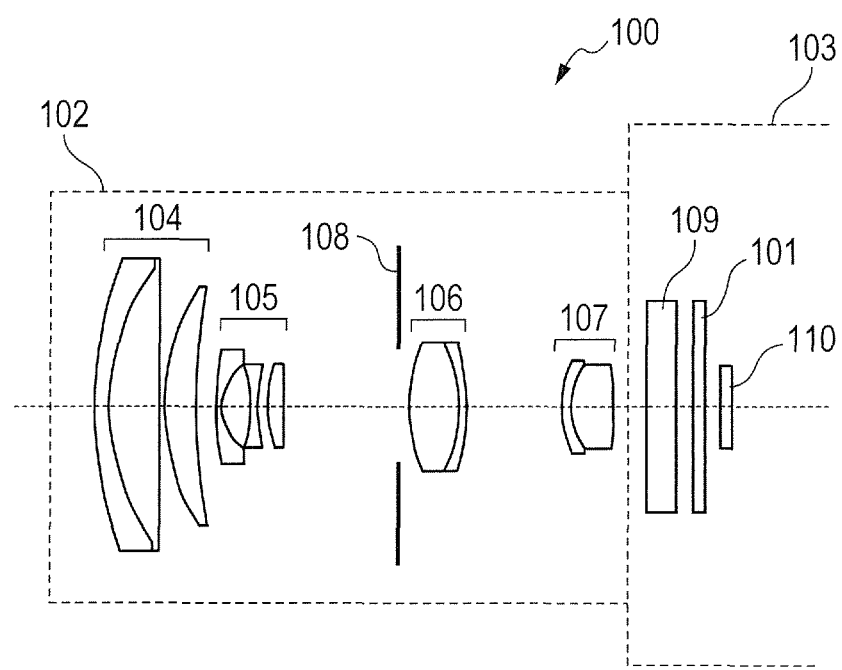
FIG. 5 is a schematic view for illustrating an example of an image pickup apparatus according to an embodiment of the present invention.

FIG. 5 is a schematic view for illustrating an example of an image pickup apparatus according to an embodiment of the present invention. An image pickup apparatus 100 of FIG. 5 includes a lens unit 102 and an image pickup unit 103, and the lens unit 102 is removably connected to the image pickup unit 103 through a mounting member (not shown). In addition, an optical filter 101 is arranged in the image pickup unit 103, specifically in the lens unit 102.

In FIG. 5, the lens unit 102 is a unit including a plurality of lenses or lens groups, and is a rear focus-type zoom lens configured to perform focusing on an image pickup element 110 side with a diaphragm.

In FIG. 5, the lens unit 102 includes, from an object side, four lens groups, i.e., a first lens group 104 having a positive refractive power, a second lens group 105 having a negative refractive power, a third lens group 106 having a positive refractive power, and a fourth lens group 107 having a positive refractive power in the stated order. The image pickup apparatus 100 of FIG. 5 changes an interval between the second lens group 105 and the third lens group 106 to vary a magnification, and moves part of the lens group of the fourth lens group 107 to perform focusing. In FIG. 5, the lens unit 102 includes the aperture diaphragm 108 between the second lens group 105 and the third lens group 106. Each member is arranged so that light to be transmitted through the lens unit 102 may be transmitted through the respective lens groups (104 to 107), the aperture diaphragm 108, and the optical filter 101 to be received by the image pickup element 110. The quantity of the light to be received by the image pickup element 110 can be adjusted with the aperture diaphragm 108 and the optical filter 101. In FIG. 5, the image pickup unit 103 includes a glass block 109 and the image pickup element 110. In addition, the optical filter 101 is arranged between the glass block 109 and the image pickup element 110.

The glass block 109 is specifically a glass block, such as a low-pass filter, a face plate, or a color filter.

The image pickup element 110 is a sensor unit configured to receive light that has been transmitted through the lens unit 102, and an image pickup element, such as a CCD or a CMOS, may be used as the image pickup element 110. In addition, the image pickup element 110 may also be an optical sensor, such as a photodiode, and a device configured to acquire and output information on intensity or wavelength of light may be used appropriately as the image pickup element 110.

In FIG. 5, the image pickup unit 103 includes the optical filter 101 arranged between the glass block 109 and the image pickup element 110 in the image pickup unit 103. In the image pickup apparatus of the present invention, the position at which the optical filter 101 is arranged is not particularly limited. For example, the filter may be arranged between the third lens group 106 and the fourth lens group 107, or may be arranged outside the lens unit 102.

The arrangement of the optical filter 101 at the position at which light converges has, for example, an advantage in that the area of the optical filter 101 can be reduced. In addition, in the image pickup apparatus of the present invention, the type of the lens unit 102 can be appropriately selected. In addition to the rear focus type, the unit may be of an inner focus type configured to perform focusing in front of the diaphragm, or may be of any other type. In addition to the zoom lens, a special lens, such as a fisheye lens or a macro lens, can also be appropriately selected.

An example of such image pickup apparatus is a product having a combination of a function of adjusting the quantity of light and a light-receiving element. The image pickup apparatus may be, for example, a camera, a digital camera, a video camera, or a digital video camera, or an image pickup portion of a mobile phone, a smartphone, a PC, or a tablet computer.

(Window Member)

A window member of the present invention includes a pair of transparent substrates, an EC element arranged between the transparent substrates, and an active element for controlling the transmittance of the EC element. The active element is connected to the EC element, and the mode of the connection to the EC element may be a mode in which the active element is directly connected to the EC element, or may be a mode in which the active element is indirectly connected to the EC element. The window member of the present invention can adjust the quantity of light to be transmitted through the transparent substrates with the EC element. In addition, the window member can be used as a window by adding a member, such as a window frame, to the member. The window member of the present invention can be used in a window of an aircraft, an automobile, a house, or the like. In addition, the window member including the EC element can also be referred to as "window member including an electronic curtain."

Figure 6A:
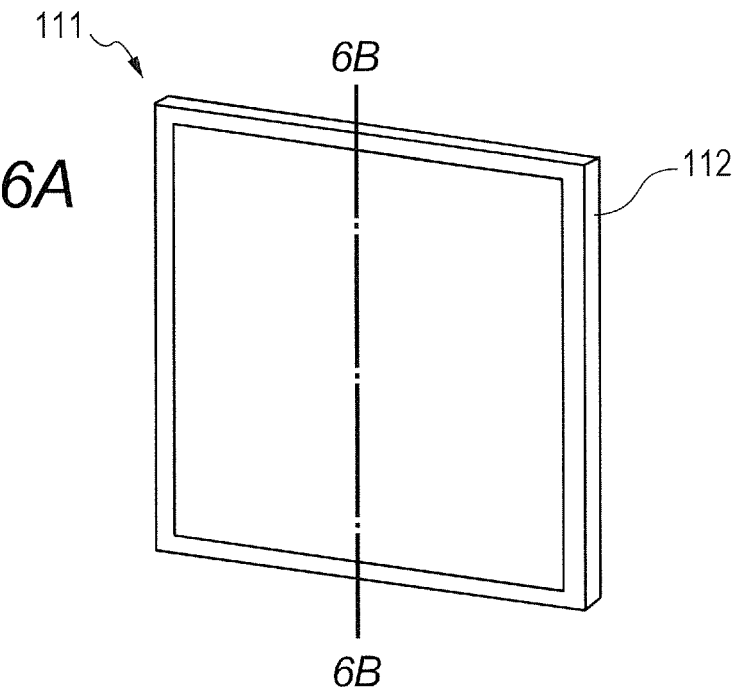
FIG. 6A and FIG. 6B are each a schematic view for illustrating an example of a window member according to an embodiment of the present invention.
Figure 6B:
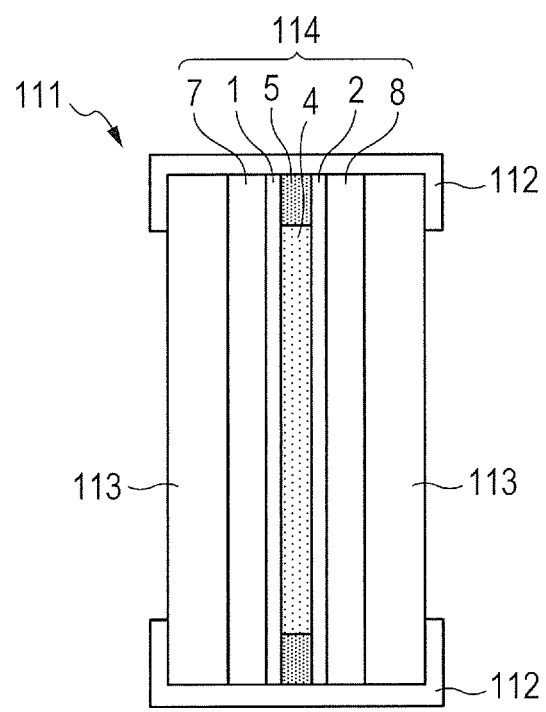

FIG. 6A and FIG. 6B are each a schematic view for illustrating an example of a window member according to an embodiment of the present invention. FIG. 6A is a perspective view of the window member, and FIG. 6B is a sectional view taken along the line 6B-6B of FIG. 6A.

A window member 111 of each of FIG. 6A and FIG. 6B is a light control window, and is formed of an EC element 114 (provided that the carrier 3 is not shown), transparent plates 113 configured to sandwich the EC element 114, and a frame 112 configured to surround the entirety to integrate the element and the plates. A unit for driving the window member 111 of each of FIG. 6A and FIG. 6B may be integrated in the frame 112, or may be connected to the EC element 114 through a wiring arranged outside the frame 112.

In the window member 111 of each of FIG. 6A and FIG. 6B, the transparent plates 113 are not particularly limited as long as the plates are materials each having a high light transmittance, and the plates are preferably glass materials in consideration of the utilization of the member as a window. In each of FIG. 6A and FIG. 6B, the EC element 114 is a constituent member independent of the transparent plates 113, but for example, the substrates (7, 8) constituting the EC element 114 may be used to resemble the transparent plates 113.

In the window member 111 of FIG. 6A and FIG. 6B, a material for the frame 112 is not particularly limited, but any member that covers at least a part of the EC element 114 and has a form of being integrated into one frame may be regarded as the frame 112.

The present invention is more specifically described below by way of Examples. However, the present invention is not limited thereto.

Synthesis Example 1

Synthesis of Compound 1

Compound 1 serving as an anodic EC material was synthesized in accordance with a synthesis scheme shown below.

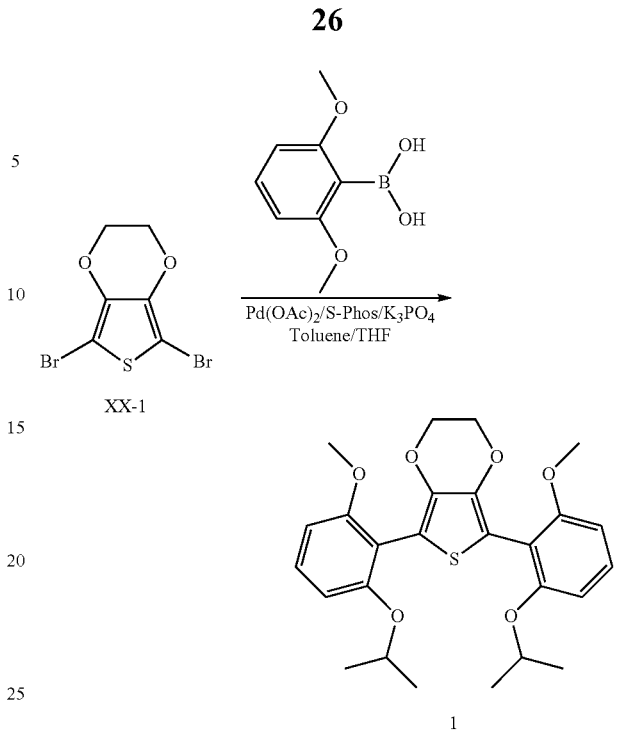

Reagents and solvents to be described below were loaded into a 50-milliliter reaction vessel.
XX-1 (2,5-dibromoethylenedioxythiophene): 500 mg (1.67 mmol)
2-Isopropoxy-6-methoxyphenylboronic acid: 1.05 g (5.0 mmol)
Toluene: 10 ml
Tetrahydrofuran: 5 ml Next, oxygen (dissolved oxygen) present in the solution was removed with nitrogen.

Next, reagents to be described below were added under a nitrogen atmosphere.
Pd(OAc)$_2$: 19 mg (0.083 mmol)
2-Dicyclohexylphosphino-2',6'-dimethoxybiphenyl (S-Phos): 89 mg (0.22 mmol)
Tripotassium phosphate: 1.92 g (8.35 mmol)

Next, a reaction was performed for 7 hours while the reaction solution was heated to reflux at 110° C.

Next, the reaction solution was cooled to room temperature and then concentrated under reduced pressure to provide a crude product. Next, the resultant crude product was separated and purified by using silica gel chromatography (mobile phase: hexane/ethyl acetate=4/3) to provide 420 mg of Compound 1 as white solid powder (yield: 54%).

In MALDI-MS measurement, the resultant compound was found to have an M$^+$ of 470. In addition, the result of NMR spectrum measurement of the resultant compound is shown below.

$^1$H-NMR (CDCl$_3$) σ (ppm): 7.21 (t, 2H), 6.63 (d, 2H), 6.60 (d, 2H), 4.41 (m, 2H), 4.20 (s, 4H), 3.81 (s, 6H), 1.25 (s, 6H), 1.24 (s, 6H).

Synthesis Example 2

Synthesis of Compound 2

Compound 2 serving as the cathodic redox substance was synthesized based on the literature of Cinnsealach et al.

(Solar Energy Materials and Solar Cells, volume 57 (1999), pp. 107-125). Compound 2 is a compound having an EC property.

Compound 2

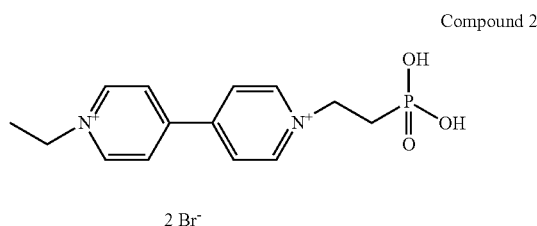 [SMILES: CC[n+]1ccc(-c2cc[n+](CCP(=O)(O)O)cc2)cc1]

2 Br⁻

Example 1

Production of Element

Figure 7A:
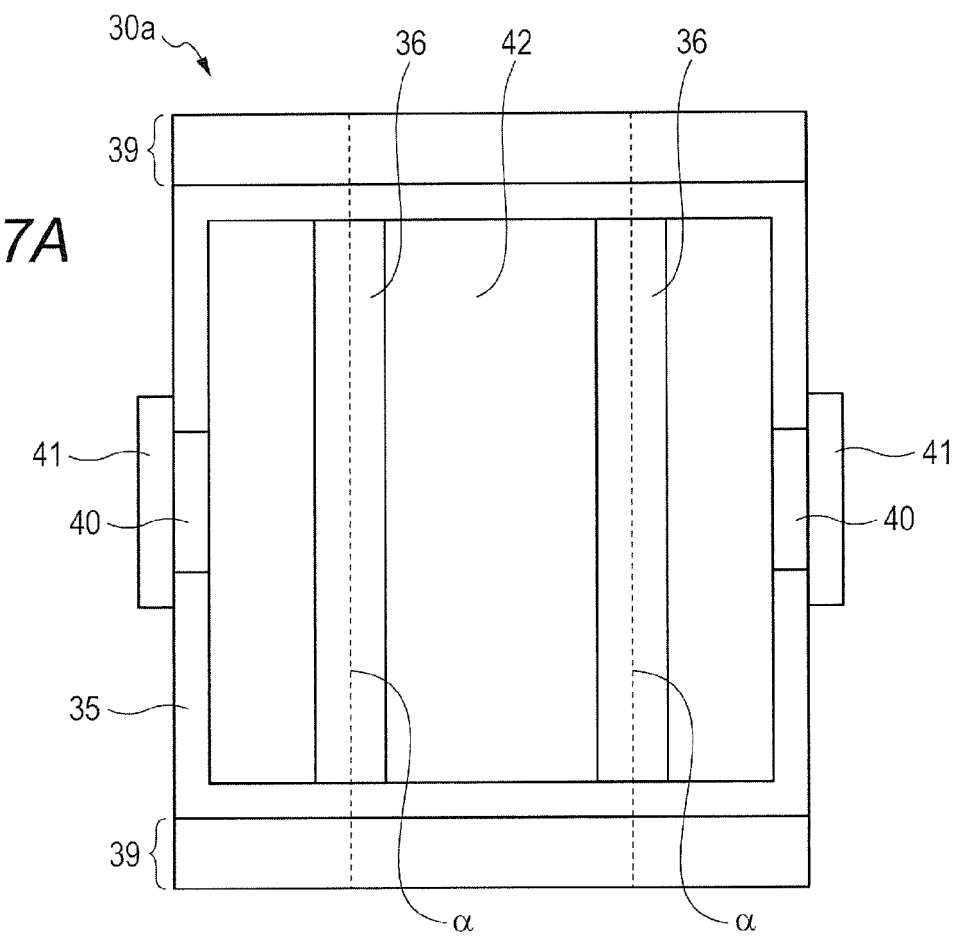
FIG. 7A and FIG. 7B are each a schematic view for illustrating an EC element produced in Example 1.
Figure 7B:
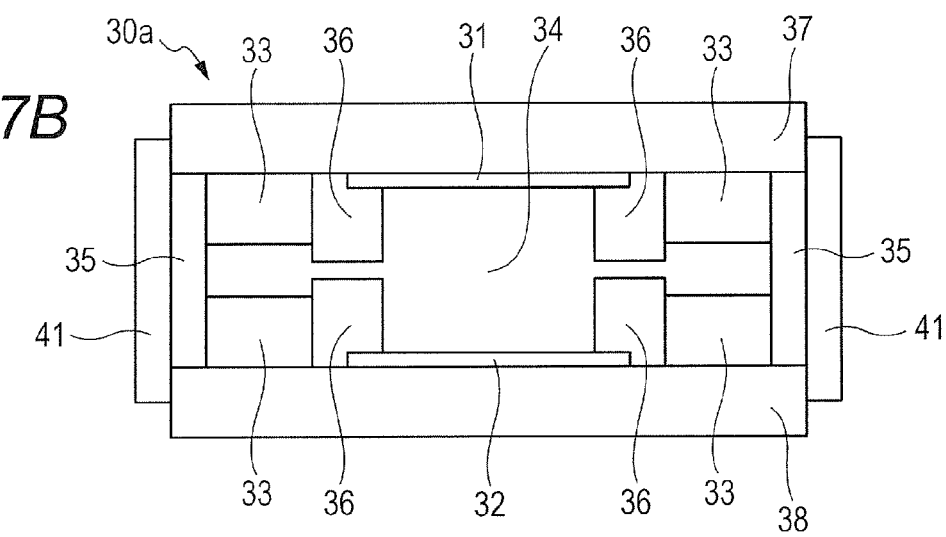

An EC element 30a illustrated in each of FIG. 7A and FIG. 7B was produced by the following steps.

(1) Preparation of Transparent Conductive Glass

First, two transparent conductive glasses each having formed thereon a tin-doped indium oxide (ITO) film were prepared.

(2) Production of Substrates

Next, the ITO film located outside positions a in FIG. 7A was partially removed with a commercially available ITO etching liquid. An ITO film 42 remaining as a result of the operation was used as a first electrode 31 or a second electrode 32.

(3) Production of Carrier

A commercially available titanium oxide nanopaste (Nanoxide-HT, manufactured by Solaronix) was applied to the region of a substrate (37, 38) from which the ITO film had been removed, and the nanopaste was calcined under the conditions of 350° C. and 60 minutes. A titanium oxide particle film formed by the calcination is not electrically connected to any external circuit, and hence functions not as an electrode but as a carrier 33. Next, a solution of 5 mM 1,1'-ferrocenedicarboxylic acid (Fc(COOH)$_2$) in ethanol was applied to the formed carrier 33, and was left at rest overnight. Next, the carrier 33 was washed with ethanol and dried. Next, an amount corresponding to half of ferrocenedicarboxylic acid fixed to the carrier 33 was oxidized with nitrosyl tetrafluoroborate. Thus, a ratio between the oxidized form and reduced form of 1,1'-ferrocenedicarboxylic acid fixed to the carrier 33 was set to about 1:1. As a result of the foregoing, the redox state of the redox substance of the carrier was brought into a state in which the oxidized form and the reduced form were mixed. Thus, the carrier 33 having a non-EC redox substance (ferrocenedicarboxylic acid) fixed to the titanium oxide nanoparticle film was formed.

(4) Bonding of Substrate

A UV-curable adhesive (TB3035B, manufactured by ThreeBond Co., Ltd.) mixed with 100-micrometer spacer beads serving as the sealing material 35 was applied to a periphery of the two transparent conductive glasses each having formed thereon the carrier 33 except for inlets 40. In addition, the adhesive free of any beads was applied between the first electrode 31 or the second electrode 32 and the carrier 33 so as to have a height of 40 μm. Thus, a partition wall 36 was formed. After that, the two transparent conductive glasses were superimposed on each other so that the first electrode 31 and the second electrode 32 were opposite to each other, and the carriers were opposite to each other, and so that electrode extraction sites 39 were exposed. Next, the adhesive was cured by applying UV light under a state in which the carrier 33 was masked so that the UV light did not impinge thereon. Thus, the substrate 37 and the substrate 38 were bonded to each other.

(5) Injection of Electrolyte Solution

An electrolyte solution was prepared by dissolving Compound 1 serving as the anodic EC material and ethyl viologen hexafluorophosphate serving as the cathodic EC material in a solution of 0.1 M tetrabutylammonium hexafluorophosphate in propylene carbonate (PC). At this time, the concentration of Compound 1 in the electrolyte solution was 20 mM, and the concentration of ethyl viologen hexafluorophosphate therein was 20 mM. Next, the electrolyte solution (electrolyte 34) was injected from the inlet 40, and was then subjected to sealing 41 with the UV-curable adhesive. Thus, the EC element 30a was obtained.

(Measurement of Redox Potential)

The redox potentials of the EC materials and the redox substance used in this example were measured. A specific method therefor is described below.

A solution was prepared by dissolving 1 mM of each of the EC materials (Compound 1 and ethyl viologen hexafluorophosphate), and the redox substance (ferrocenedicarboxylic acid) in a solution of 0.1 M tetrabutylammonium hexafluorophosphate in propylene carbonate (PC). Next, CV measurement was performed by using ITO as a working electrode, platinum as a counter electrode, and Ag/Ag⁺ (PF$_6$, PC) as a reference electrode. As a result, the half-wave potentials (redox potentials) of the respective compounds were as shown in Table 1 below.

TABLE 1

| | Redox potential [V] |
|---|---|
| Compound 1 (anodic EC material) | 0.23 |
| Ethyl viologen (cathodic EC material) | −1.24 |
| Ferrocenedicarboxylic acid (redox substance) | 0.08 |

It was confirmed from the results that in this example, the reduced form of the redox substance of the carrier was more easily oxidized than the reduced form of the anodic EC material. It was also confirmed that the oxidized form of the redox substance of the carrier was more easily reduced than the oxidized form of the cathodic EC material.

(Durable Driving of EC Element)

A durable driving experiment was performed on the resultant EC element. Specifically, the driving of the EC element formed of the application of a voltage of 1.62 V between the first electrode 31 and the second electrode 32, and short-circuiting between the first electrode and the second electrode was repeatedly performed. At the time of the repeated driving, a time for the application of the voltage (driving time for which the element was brought into a colored state) was set to 5 seconds, and a time for the short-circuiting (driving time for which the element was brought into a decolored state) was set to 600 seconds.

A decoloring failure due to charge imbalance was observed visually and with a spectroscope. The observation of the decoloring failure with the spectroscope was performed by the following procedure. Specifically, light that had been transmitted through the first electrode 31 and the second electrode 32 from a light source (DH-20005 manufactured by Ocean Optics) through an optical fiber was detected with a spectroscope (USB4000 manufactured by the company). At this time, the EC element 30a was arranged so that the first electrode 31 and the second electrode 32 were in the optical path of the transmitted light, and the carrier 33 deviated from the optical path.

Comparative Example 1

An EC element was produced by the same method as that of Example 1 except that in Example 1, the steps (2) and (3) were omitted at the time of the production of the EC element. In this comparative example, the ITO film formed on the transparent conductive glass corresponds to the first electrode 31 or the second electrode 32 in each of FIG. 7A and FIG. 7B.

(Results of Durable Driving of EC Elements)

The results of the durable driving of the EC elements for Example 1 and Comparative Example 1 are summarized in Table 2 below.

When the cycle of a driving operation including the application of a voltage between both the electrodes (31, 32) and short-circuiting between both the electrodes (31, 32) was repeatedly performed, a decoloring failure occurred in the EC element of Comparative Example 1 free of the carrier 33. Specifically, in the short term, a pale yellow decoloring failure due to anodic charge imbalance, the failure having a peak top at 445 nm, occurred. The decoloring failure results from a radical cation of Compound 1. Meanwhile, in the long term, a blue decoloring failure due to cathodic charge imbalance, the failure having a peak top at 605 nm, occurred. The decoloring failure results from a radical cation of ethyl viologen.

In contrast, a decoloring failure resulting from charge imbalance was not observed in the EC element of Example 1 including the carrier 33 having the redox substance, and hence it was confirmed that charge rebalancing was effectively performed.

TABLE 2

|  | Short-term cycle (10 cycles or less) | Long-term cycle (1,000 cycles or less) |
| --- | --- | --- |
| Example 1 | Decoloring failure was not observed | Decoloring failure was not observed |
| Comparative Example 1 | Decoloring failure was observed(Note 1) | Decoloring failure was observed(Note 2) |

(Note 1)Decoloring failure resulting from the charge imbalance due to the anodic EC material
(Note 2)Decoloring failure resulting from the charge imbalance due to the cathodic EC material It was confirmed from the foregoing that when the following conditions were satisfied in an EC element including an anodic EC material and a cathodic EC material, the adjustment of charge imbalance was effectively performed by the carrier 33 in the EC element 30a, and hence a decoloring failure was suppressed:

(1a) the element includes an anodic EC material whose redox potential is more positive than that of the redox substance of the carrier 33 (the reduced form of the redox substance of the carrier 33 is more easily oxidized than the reduced form of the anodic EC material);

(1b) the element includes a cathodic EC material whose redox potential is more negative than that of the redox substance of the carrier 33 (the oxidized form of the redox substance of the carrier 33 is more easily reduced than the oxidized form of the cathodic EC material);

(1c) the decoloring failure is uniformly reduced by placing the carrier 33 in at least part of the periphery of the first electrode 31 or the second electrode 32; and (1d) in an initial state, the redox state of the redox substance of the carrier 33 is in a state in which the oxidized form and the reduced form are mixed.

Example 2

Production of Element

Figure 8A:
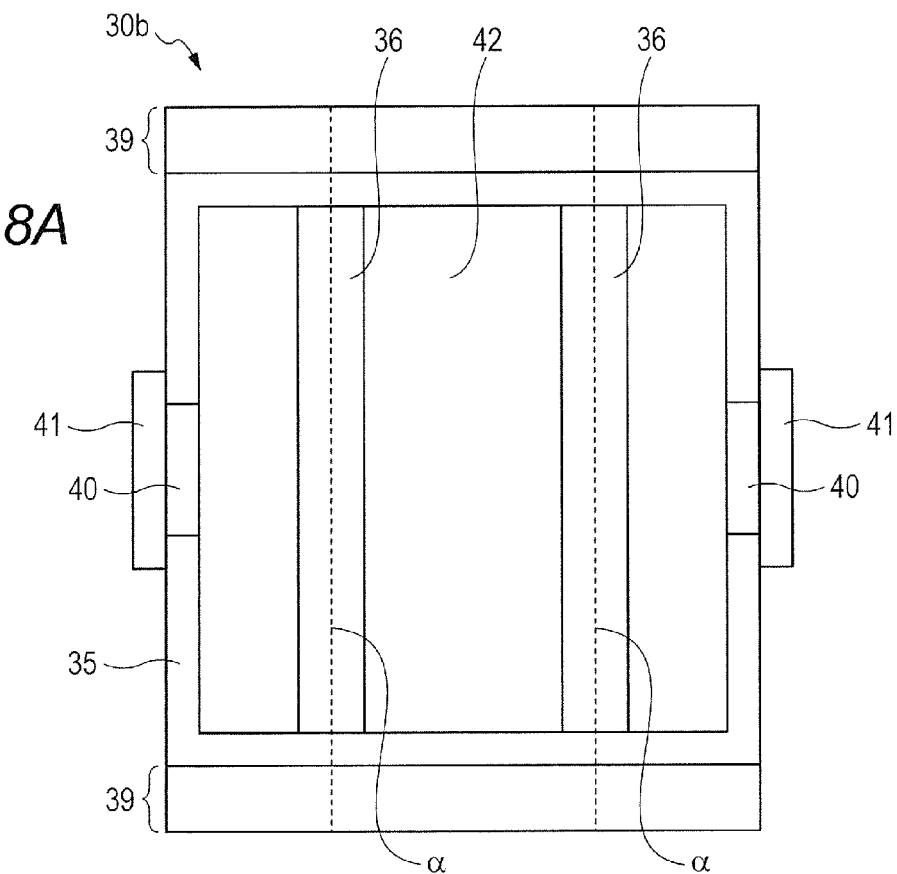
FIG. 8A and FIG. 8B are each a schematic view for illustrating an EC element produced in Example 2.
Figure 8B:
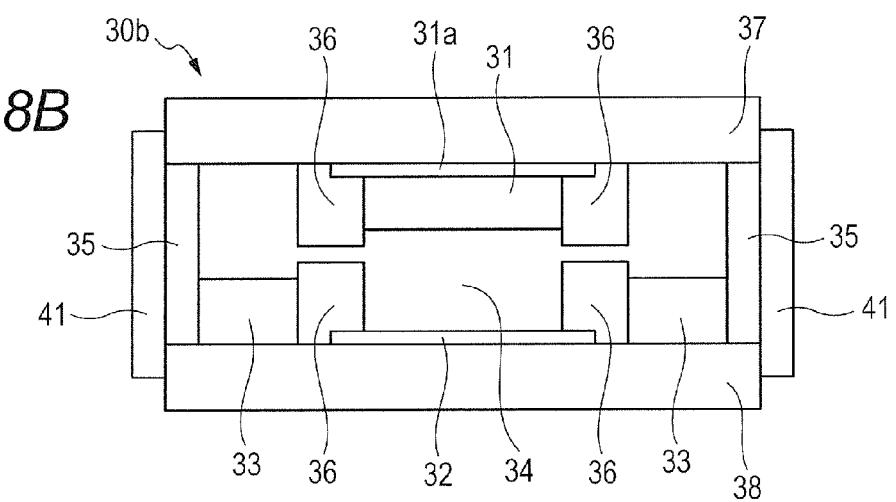

An EC element 30b illustrated in each of FIG. 8A and FIG. 8B was produced by the following steps.

(1) Preparation of Transparent Conductive Glass

First, two transparent conductive glasses each having formed thereon a tin-doped indium oxide (ITO) film were prepared.

(2) Production of Substrates

Next, the ITO film located outside positions a in FIG. 8A was partially removed with a commercially available ITO etching liquid. An ITO film remaining as a result of the operation was used as a first electrode 31 or a second electrode 32.

(3) Production of First Electrode (Porous Electrode)

12 Grams of antimony-doped tin oxide nanoparticles (manufactured by Ishihara Sangyo Kaisha, Ltd.), 2 mL of concentrated nitric acid, and 200 mL of water were mixed, and the mixture was stirred at 80° C. for 8 hours. After that, the mixture was dried in a vacuum for 1 day to provide a cake of tin oxide nanoparticles. Next, 20 mL of water, 1.2 g of polyethylene glycol, and 0.4 g of hydroxypropylcellulose were added to 4 g of the cake, and then the mixture was stirred for 15 days to prepare a slurry. Next, the slurry was applied and formed on an ITO film 31a arranged in the region where the first electrode was to be formed, and was then calcined under the conditions of 350° C. and 60 minutes to provide an antimony-doped tin oxide nanoparticle film (hereinafter sometimes referred to as "nanoparticle film"). A 5 mM solution of 1,1'-ferrocenedicarboxylic acid serving as an anodic redox substance (non-EC substance) in ethanol was applied to the nanoparticle film, and was left at rest overnight. Next, the nanoparticle film was washed with ethanol and dried to produce the first electrode 31.

(4) Production of Carrier

A commercially available titanium oxide nanopaste was applied to the region of the substrate 38 having the second electrode 32 from which the ITO film had been removed by the same method as that of the step (3) of Example 1, and the nanopaste was calcined under the conditions of 350° C. and 60 minutes to form a porous titanium oxide particle film. The titanium oxide particle film is not electrically connected to any external circuit, and hence functions not as an electrode but as the carrier 33. Next, a 1 mM aqueous solution of Compound 2 serving as a cathodic redox substance (EC substance) was applied to the titanium oxide particle film, and was left at rest overnight. Next, the titanium oxide particle film was washed and dried to produce the carrier 33.

(Evaluation for Ease of Oxidation or Reduction)

Which one of the redox substance (Compound 2) fixed to the carrier 33 and the cathodic EC material (ethyl viologen) was more easily oxidized than the other was judged by a method to be described below. First, a curing agent (Bond Quick 5B) for an epoxy adhesive containing an amine serving as a reducing agent was added to a solution of ethyl viologen in methanol to bring ethyl viologen into a reduced state (blue color). Next, under a nitrogen atmosphere, the solution containing ethyl viologen in a reduced state was dropped onto the carrier 33 having fixed thereto the redox substance (Compound 2). Then, the blue color derived from ethyl viologen disappeared, and the color of the carrier 33 changed to a pale yellowish green color instead. The fact that the color of the carrier 33 changed to a pale yellowish green color as described above means that Compound 2 was reduced.

Thus, the transfer of an electron from the reduced form of ethyl viologen (cathodic EC material) to the oxidized form of Compound 2 (redox substance (EC compound)) was confirmed. Accordingly, it was able to be confirmed that the cathodic EC material was more easily oxidized than the redox substance of the carrier 33. Meanwhile, even the dropping of a 5 mM solution of ferrocenedicarboxylic acid in ethanol onto the carrier 33 having fixed thereto Compound 2 did not color the carrier 33 pale yellowish green. It was found from the foregoing that the reduced form of the redox substance of the carrier 33 was more easily oxidized than the reduced form of the anodic redox substance of the first electrode 31.

(5) Bonding of Substrates

A UV-curable adhesive (TB3035B, manufactured by ThreeBond Co., Ltd.) serving as the sealing material 35 was applied to a periphery of transparent conductive glass (substrate 37) having formed thereon the carrier 33 except for inlets 40. In addition, the adhesive free of any beads was applied between the first electrode 31 or the second electrode 32 and the carrier 33 so as to have a height of 40 µm. Thus, a partition wall 36 was formed. After that, the two transparent conductive glasses were superimposed on each other so that the first electrode 31 and the second electrode 32 were opposite to each other, and the carriers were opposite to each other, and so that electrode extraction sites 39 were exposed. Next, the adhesive was cured by applying UV light under a state in which the carrier 33 was masked so that the UV light did not impinge thereon. Thus, the substrate 37 and the substrate 38 were bonded to each other.

(6) Injection of Electrolyte Solution

An electrolyte solution was prepared by dissolving ethyl viologen hexafluorophosphate serving as the cathodic EC material in a solution of 0.1 M tetrabutylammonium hexafluorophosphate in propylene carbonate (PC). At this time, the concentration of ethyl viologen hexafluorophosphate in the electrolyte solution was 20 mM. Next, the electrolyte solution (electrolyte 34) was injected from the inlet 40, and was then subjected to sealing 41 with the UV-curable adhesive. Thus, the EC element 30b was obtained.

(Durable Driving of EC Element)

A durable driving experiment was performed on the resultant EC element. Specifically, the driving of the EC element formed of the application of a voltage of 1.8 V between the first electrode 31 and the second electrode 32, and short-circuiting between the first electrode 31 and the second electrode 32 was repeatedly performed. At the time of the repeated driving, a time for the application of the voltage (driving time for which the element was brought into a colored state) was set to 5 seconds, and a time for the short-circuiting (driving time for which the element was brought into a decolored state) was set to 600 seconds.

A decoloring failure due to charge imbalance was observed by the same method as that of Example 1. At the time of the observation of the decoloring failure with a spectroscope, the EC element 30b was arranged so that the first electrode 31 and the second electrode 32 were in the optical path of transmitted light, and the carrier 33 deviated from the optical path.

Comparative Example 2

An EC element was produced by the same method as that of Example 2 except that in Example 2, at the time of the production of the EC element, the step (2) was omitted and the production of the carrier was omitted in the step (4). In this comparative example, a porous film corresponding to the first electrode 31 in each of FIG. 8A and FIG. 8B is formed on the ITO film formed on the transparent conductive glass.

In addition, in the resultant EC element, the driving of the EC element formed of the application of a voltage of 1.8 V between the first electrode and the second electrode, and short-circuiting between the first electrode and the second electrode was repeatedly performed.

(Results of Durable Driving of EC Elements)

The results of the durable driving of the EC elements for Example 2 and Comparative Example 2 are summarized in Table 3 below.

When the cycle of a driving operation including the application of a voltage between both the electrodes (31, 32) and short-circuiting between both the electrodes (31, 32) was repeatedly performed, a decoloring failure occurred in the EC element of Comparative Example 2 free of any carrier. Specifically, in the short term to the long term, a blue decoloring failure due to cathodic charge imbalance, the failure having a peak top at 605 nm, occurred. The decoloring failure results from a radical cation of ethyl viologen.

In contrast, a decoloring failure resulting from charge imbalance was not observed in the EC element of Example 2 including the carrier 33 having the redox substance, and hence it was confirmed that charge rebalancing was effectively performed. At the time of the durable driving of the EC element of Example 2, the carrier 33 was colored pale yellowish green. It was more clearly confirmed from the coloring that charge rebalancing was effectively performed by using the carrier 33 having the redox substance.

TABLE 3

| | Short-term cycle (10 cycles or less) | Long-term cycle (1,000 cycles or less) |
|---|---|---|
| Example 2 | Decoloring failure was not observed in the first electrode and the second electrode[Note 3] | Decoloring failure was not observed in the first electrode and the second electrode[Note 3] |
| Comparative Example 2 | Decoloring failure resulting from the charge imbalance due to the cathodic EC material | Decoloring failure resulting from the charge imbalance due to the cathodic EC material |

[Note 3]The carrier was colored pale yellowish green

The following matters were able to be confirmed from the foregoing:

(2a) when the following conditions are satisfied in an EC element including an anodic redox substance of the first electrode 31 and a cathodic EC material of the second electrode 32, the adjustment of charge imbalance is effectively performed by the carrier 33, and hence a decoloring failure is suppressed;

(2a-1) the oxidized form of the redox substance of the carrier 33 is more easily reduced than the oxidized form of the cathodic EC material;

(2a-2) the reduced form of the redox substance of the carrier 33 is more easily oxidized than the reduced form of the anodic redox substance of the first electrode 31;
(2a-3) the decoloring failure is uniformly reduced by arranging the carrier 33 in at least part of the periphery of the first electrode 31 or the second electrode 32;
(2a-4) the element includes a unit for controlling a potential difference between the carrier 33 and the second electrode 32;
(2a-5) the element includes a unit for performing short-circuiting between the carrier 33 and the second electrode 32 at the time of a decoloring operation;
(2b) even when the redox substance or the EC material is fixed to the first electrode 31 or the second electrode 32, the adjustment of the charge imbalance can be effectively performed; and
(2c) when the redox substance of the carrier 33 has an EC property, the situation of charge rebalancing can be easily observed.

Example 3

Production of Element

Figure 9A:
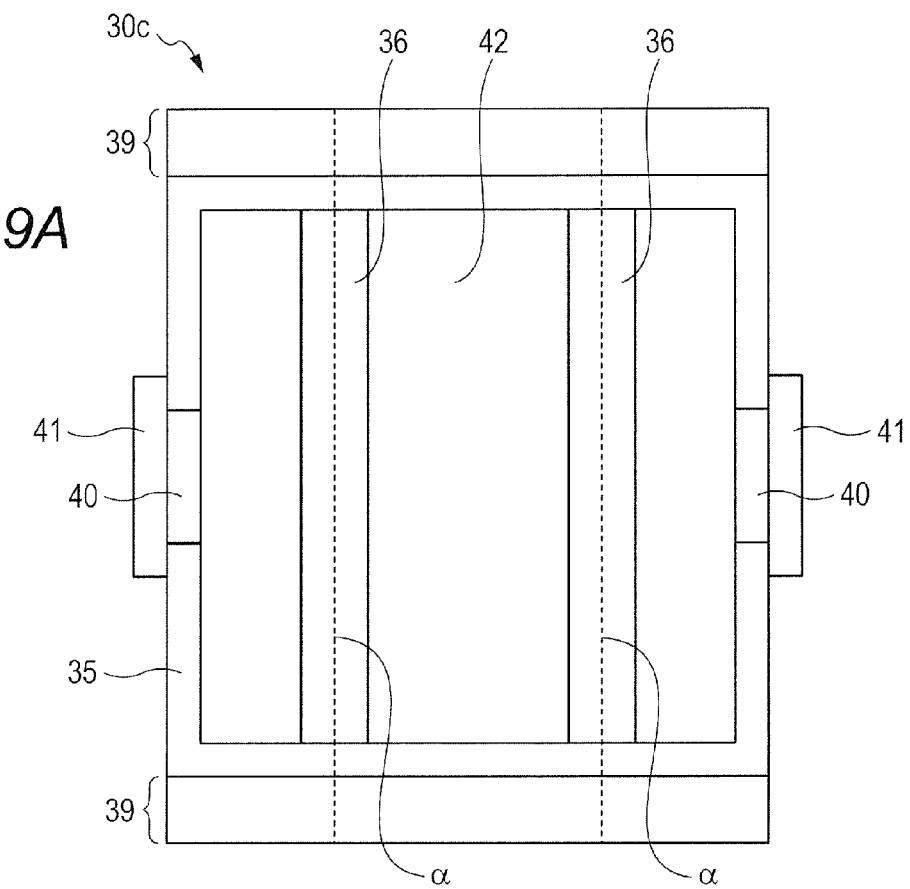
FIG. 9A and FIG. 9B are each a schematic view for illustrating an EC element produced in Example 3.
Figure 9B:
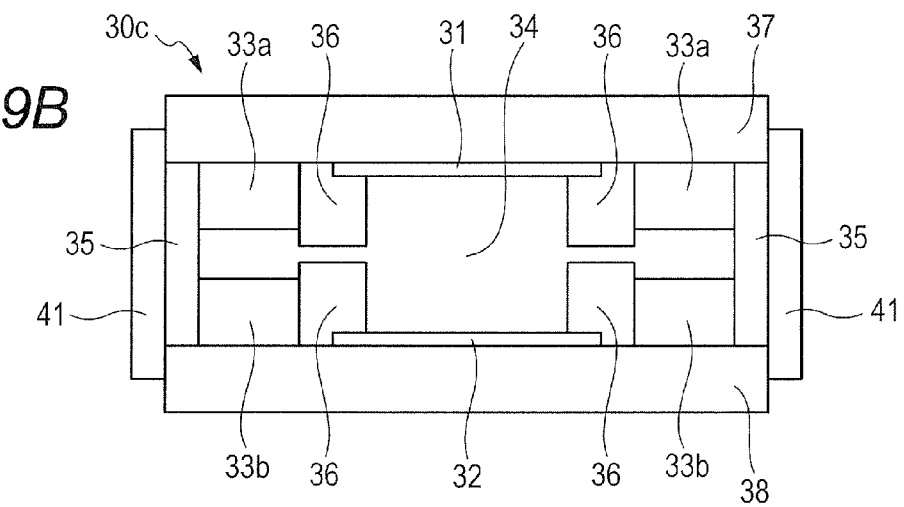

An EC element 30c illustrated in each of FIG. 9A and FIG. 9B was produced by the following steps.
(1) Preparation of Transparent Conductive Glass
First, two transparent conductive glasses each having formed thereon a tin-doped indium oxide (ITO) film were prepared.
(2) Production of Substrates
Next, the ITO film located outside positions a in FIG. 9A was partially removed with a commercially available ITO etching liquid. An ITO film remaining as a result of the operation was used as a first electrode 31 or a second electrode 32.
(3) Production of Carriers
A titanium oxide particle film was formed in the region of the substrate (37, 38) from which the ITO film had been removed by the same method as that of Example 1. Next, 1,1'-ferrocenedicarboxylic acid (Fc(COOH)$_2$) was fixed to the titanium oxide particle film of the first transparent conductive glass (substrate 37) by the same method as that of the step (3) of Example 1. Next, Compound 2 was fixed to the nanoparticle film of the second transparent conductive glass (substrate 38) by the same method as that of the step (4) of Example 2. Thus, carriers having fixed thereto redox substances, specifically a carrier 33a of the substrate 37 and a carrier 33b of the substrate 38 were produced.
(4) Bonding of Substrates
A UV-curable adhesive (TB3035B, manufactured by ThreeBond Co., Ltd.) mixed with 100-micrometer spacer beads serving as the sealing material 35 was applied to a periphery of the two transparent conductive glasses (substrates (37, 38)) having formed thereon the carriers (33a, 33b) except for inlets 40. In addition, a partition wall 36 was formed by the same method as that of the step (4) of Example 1. After that, the two transparent conductive glasses were superimposed on each other so that the first electrode 31 and the second electrode 32 were opposite to each other, and the carriers (33a, 33b) were opposite to each other, and so that electrode extraction sites 39 were exposed. Next, the adhesive was cured by applying UV light under a state in which the carriers (33a, 33b) were masked so that the UV light did not impinge thereon. Thus, the substrate 37 and the substrate 38 were bonded to each other.

(5) Injection of Electrolyte Solution
An electrolyte solution was prepared by dissolving Compound 1 serving as the anodic EC material and ethyl viologen hexafluorophosphate serving as the cathodic EC material in a solution of 0.1 M tetrabutylammonium hexafluorophosphate in propylene carbonate (PC). At this time, the concentration of Compound 1 serving as the anodic EC material in the electrolyte solution was 20 mM, and the concentration of ethyl viologen hexafluorophosphate serving as the cathodic EC material therein was 20 mM. Next, the electrolyte 34 in a solution form was injected from the inlet 40, and was then subjected to sealing 41 with the UV-curable adhesive. Thus, the EC element 30c was obtained.
(Durable Driving of EC Element)
A durable driving experiment was performed on the resultant EC element. Specifically, the driving of the EC element formed of the application of a voltage of 1.62 V between the first electrode 31 (anode) and the second electrode 32, and short-circuiting between the first electrode and the second electrode was repeatedly performed. At the time of the repeated driving, a time for the application of the voltage (driving time for which the element was brought into a colored state) was set to 5 seconds, and a time for the short-circuiting (driving time for which the element was brought into a decolored state) was set to 600 seconds.
A decoloring failure due to charge imbalance was observed visually and with a spectroscope. The observation of the decoloring failure with the spectroscope was performed by the following procedure. Specifically, light that had been transmitted through the first electrode 31 and the second electrode 32 from a light source (DH-20005 manufactured by Ocean Optics) through an optical fiber was detected with a spectroscope (USB4000 manufactured by the company). At this time, the EC element 30c was arranged so that the first electrode 31 and the second electrode 32 were in the optical path of the transmitted light, and the carrier 33 deviated from the optical path.

Comparative Example 3

An EC element was produced by the same method as that of Example 3 except that in Example 3, the steps (2) and (3) were omitted at the time of the production of the EC element. In this comparative example, the ITO film formed on the transparent conductive glass corresponds to the first electrode 31 or the second electrode 32 in each of FIG. 9A and FIG. 9B.
In addition, in the resultant EC element, the driving of the EC element formed of the application of a voltage of 1.62 V between the first electrode and the second electrode, and short-circuiting between the first electrode and the second electrode was repeatedly performed.
(Results of Durable Driving of EC Elements)
The results of the durable driving of the EC elements for Example 3 and Comparative Example 3 are summarized in Table 4 below.
When the cycle of a driving operation including the application of a voltage between both the electrodes (31, 32) and short-circuiting between both the electrodes (31, 32) was repeatedly performed, a decoloring failure similar to that in Comparative Example 1 occurred in the EC element of Comparative Example 3 free of the carrier 33.
In contrast, a decoloring failure resulting from charge imbalance was not observed in the EC element of Example 3 including the carriers (33a, 33b) 33 each having the redox substance. In addition, when the durable driving of the EC element of Example 3 was performed for a long time period (1,000 cycles or less), the carriers (33a, 33b) were each colored pale yellowish green. It was clearly confirmed from the coloring that charge rebalancing was effectively performed in the EC element of Example 3 including the carriers (33a, 33b) having fixed thereto the redox substances.

TABLE 4

| | Short-term cycle (10 cycles or less) | Long-term cycle (1,000 cycles or less) |
|---|---|---|
| Example 3 | Decoloring failure was not observed | Decoloring failure was not observed[Note 4] |
| Comparative Example 3 | Decoloring failure was observed[Note 5] | Decoloring failure was observed[Note 6] |

[Note 4] The carriers having fixed thereto Compound 2 were each colored pale yellowish green.
[Note 5] Decoloring failure resulting from the charge imbalance due to the anodic EC material
[Note 6] Decoloring failure resulting from the charge imbalance due to the cathodic EC material It was confirmed from the foregoing that when the following conditions were satisfied in an EC element including an anodic EC material and a cathodic EC material, the adjustment of charge imbalance was effectively performed by the carriers (33a, 33b) in the EC element 30, and hence a decoloring failure was suppressed:
(3a) the reduced form of each of the redox substances of the carriers (33a, 33b) is more easily oxidized than the reduced form of the anodic EC material (the redox substances of the carriers (33a, 33b) each have a redox potential more negative than that of the anodic EC material;
(3b) the oxidized form of each of the redox substances of the carriers (33a, 33b) is more easily reduced than the oxidized form of the cathodic EC material (the redox substances of the carriers (33a, 33b) each have a redox potential more positive than that of the cathodic EC material;
(3c) the decoloring failure is uniformly reduced by placing each of the carriers (33a, 33b) in at least part of the periphery of the first electrode 31 or the second electrode 32; and
(3d) the carriers (33a, 33b) have a plurality of redox substances.

According to the present invention, there can be provided an EC element suppressed in changes in optical characteristics with a lapse of time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-133575, filed Jul. 2, 2015, and Japanese Patent Application No. 2016-117590, filed Jun. 14, 2016, which are hereby incorporated by reference herein in their entirety.

What is claimed is:

1. An electrochromic element, comprising:
a first electrode;
a second electrode;
a carrier; and
an electrolyte, an anodic organic electrochromic compound, and a cathodic redox substance that are arranged between the first electrode and the second electrode,
at least one of the first electrode and the second electrode being transparent, wherein:

the electrolyte, the anodic organic electrochromic compound, and the cathodic redox substance are mixed;
the electrolyte is in contact with the first electrode, the second electrode, and the carrier;
the carrier further has a redox substance; and
a reduced form of the redox substance of the carrier is more easily oxidized than a reduced form of the anodic organic electrochromic compound.

2. The electrochromic element according to claim 1, wherein a redox potential $E_{EC}(A)$ of the anodic organic electrochromic compound and a redox potential $E_{RO}$ of the redox substance of the carrier satisfy the following formula (I):

$$E_{RO} < E_{EC}(A) \qquad (I).$$

3. The electrochromic element according to claim 1, wherein the reduced form of the redox substance of the carrier reduces an oxidized form of the anodic organic electrochromic compound.

4. The electrochromic element according to claim 1, wherein the mixing comprises dissolution.

5. The electrochromic element according to claim 1, wherein the carrier is arranged outside an optical path of light to be transmitted through at least one of the first electrode and the second electrode.

6. The electrochromic element according to claim 1, wherein the redox substance of the carrier comprises an electrochromic compound.

7. The electrochromic element according to claim 1, wherein the carrier is arranged in at least part of a periphery of one of the first electrode and the second electrode.

8. The electrochromic element according to claim 1, wherein the carrier has two or more kinds of redox substances.

9. The electrochromic element according to claim 1, wherein the redox substance of the carrier is in a state in which an oxidized form thereof and the reduced form thereof are mixed.

10. An optical filter, comprising:
the electrochromic element of claim 1; and
an active element connected to the electrochromic element.

11. A lens unit, comprising:
an image pickup optical system including a plurality of lenses; and
the optical filter of claim 10.

12. An image pickup apparatus, comprising:
an image pickup optical system including a plurality of lenses;
the optical filter of claim 10; and
an image pickup element configured to receive light transmitted through the optical filter.

13. The image pickup apparatus according to claim 12, wherein the image pickup optical system is removably mounted.

14. A window member, comprising:
a pair of transparent substrates;
the electrochromic element of claim 1 arranged between the pair of transparent substrates; and
an active element connected to the electrochromic element.

15. An electrochromic element, comprising:
a first electrode;
a second electrode;
a carrier; and an electrolyte, a cathodic organic electrochromic compound, and an anodic redox substance that are arranged between the first electrode and the second electrode, at least one of the first electrode and the second electrode being transparent, wherein:

the electrolyte, the cathodic organic electrochromic compound, and the anodic redox substance are mixed;

the electrolyte is in contact with the first electrode, the second electrode, and the carrier;

the carrier further has a redox substance; and an oxidized form of the redox substance of the carrier is more easily reduced than an oxidized form of the cathodic organic electrochromic compound.

16. The electrochromic element according to claim 15, wherein a redox potential $E_{EC}(C)$ of the cathodic organic electrochromic compound and a redox potential $E_{RO}$ of the redox substance of the carrier satisfy the following formula (II):

$$E_{RO} > E_{EC}(C) \tag{II}$$

17. The electrochromic element according to claim 15, wherein the oxidized form of the redox substance of the carrier oxidizes a reduced form of the cathodic organic electrochromic compound.

18. An electrochromic element, comprising:
a first electrode;
a second electrode;
a carrier; and
an electrolyte, an anodic organic electrochromic compound, and a cathodic organic electrochromic compound that are arranged between the first electrode and the second electrode, at least one of the first electrode and the second electrode being transparent, wherein:

the electrolyte, the anodic organic electrochromic compound, and the cathodic organic electrochromic compound are mixed;

the electrolyte is in contact with the first electrode, the second electrode, and the carrier;

the carrier contains a redox substance;

a reduced form of the redox substance of the carrier is more easily oxidized than a reduced form of the anodic organic electrochromic compound; and an oxidized form of the redox substance of the carrier is more easily reduced than an oxidized form of the cathodic organic electrochromic compound.

19. The electrochromic element according to claim 18, wherein a redox potential $E_{EC}(A)$ of the anodic organic electrochromic compound, a redox potential $E_{EC}(C)$ of the cathodic organic electrochromic compound, and a redox potential $E_{RO}$ of the redox substance of the carrier satisfy the following formula (III):

$$E_{EC}(C) < E_{RO} < E_{EC}(A) \tag{III}$$

* * * * *